(12) United States Patent
Maruyama et al.

(10) Patent No.: US 10,057,485 B2
(45) Date of Patent: Aug. 21, 2018

(54) IMAGING APPARATUS AND METHODS FOR GENERATING A GUIDE DISPLAY USING IMAGING HEIGHT POSTURE INFORMATION

(71) Applicant: Olympus Corporation, Hachioji-shi, Tokyo (JP)

(72) Inventors: Atsushi Maruyama, Sagamihara (JP); Kazuhiko Shimura, Hachioji (JP); Takashi Kobiki, Sagamihara (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/462,590

(22) Filed: Mar. 17, 2017

(65) Prior Publication Data

US 2017/0195558 A1  Jul. 6, 2017

Related U.S. Application Data

(63) Continuation of application No. 14/956,812, filed on Dec. 2, 2015, now Pat. No. 9,639,940, which is a (Continued)

(30) Foreign Application Priority Data

Jun. 12, 2012 (JP) ................................ 2012-133096

(51) Int. Cl.
*H04N 5/232* (2006.01)
*G06K 9/46* (2006.01)
(Continued)

(52) U.S. Cl.
CPC ......... *H04N 5/23222* (2013.01); *G03B 17/18* (2013.01); *G06T 7/74* (2017.01);
(Continued)

(58) Field of Classification Search
CPC ... G06T 7/74; H04N 5/23293; H04N 5/23296
See application file for complete search history.

(56) References Cited

U.S. PATENT DOCUMENTS

2012/0127310 A1* 5/2012 Kim .......................... B60R 1/00
                                                     348/148
2012/0249583 A1* 10/2012 Nishiyama ......... H04N 1/00129
                                                     345/629

FOREIGN PATENT DOCUMENTS

JP         09-037203       2/1997
JP         2012-090106     5/2012

OTHER PUBLICATIONS

Second Office Action corresponding to Chinese Patent Application No. 201380007065.2, dated Jun. 30, 2017 (7 pgs.), with translation (15 pgs.).

* cited by examiner

*Primary Examiner* — Ahmed A Berhan
(74) *Attorney, Agent, or Firm* — John C. Pokotylo; Pokotylo Patent Services

(57) ABSTRACT

A display apparatus (which may be included in an imaging apparatus) includes: a display unit; a guide display generation circuit which acquires an image file including image data and photographing posture data including information of an inclination and a height of an imaging apparatus performing an imaging operation when the image data was created by the imaging operation to generate a photographing posture guide display based on the photographing posture data; and a display control circuit which causes the display unit to display an image based on the image data and the photographing posture guide display. A data processing apparatus may include a signal processing circuit which creates an image file including image data and photographing posture data.

14 Claims, 19 Drawing Sheets

Related U.S. Application Data continuation of application No. 14/312,710, filed on Jun. 24, 2014, now Pat. No. 9,237,273, which is a continuation of application No. PCT/JP2013/057297, filed on Mar. 14, 2013.

(51) Int. Cl.
*G06T 7/73* (2017.01)
*G03B 17/18* (2006.01)

(52) U.S. Cl.
CPC ............ *H04N 5/23293* (2013.01); *G06K 9/46* (2013.01); *G06T 2207/30201* (2013.01)

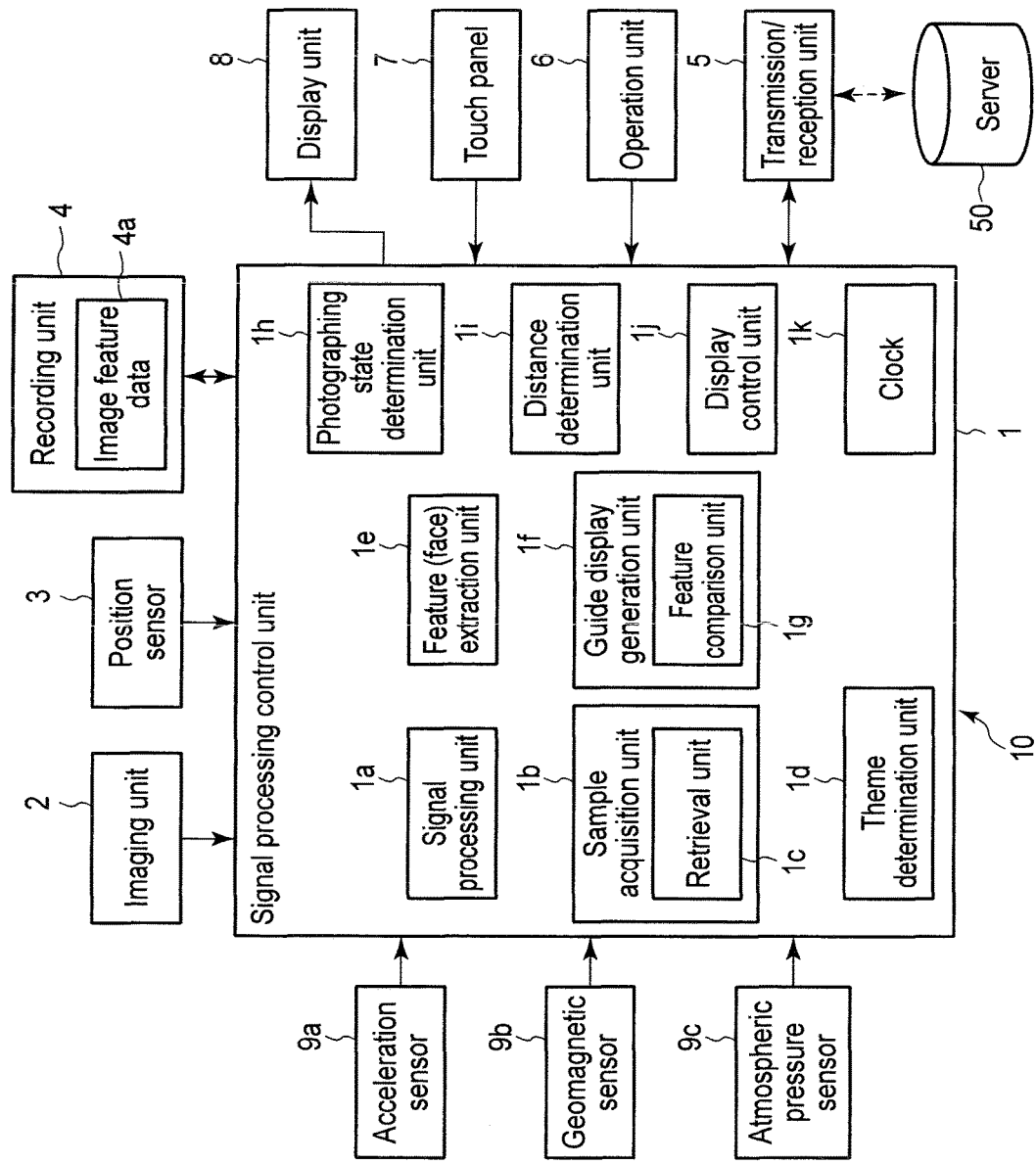
F I G. 1A

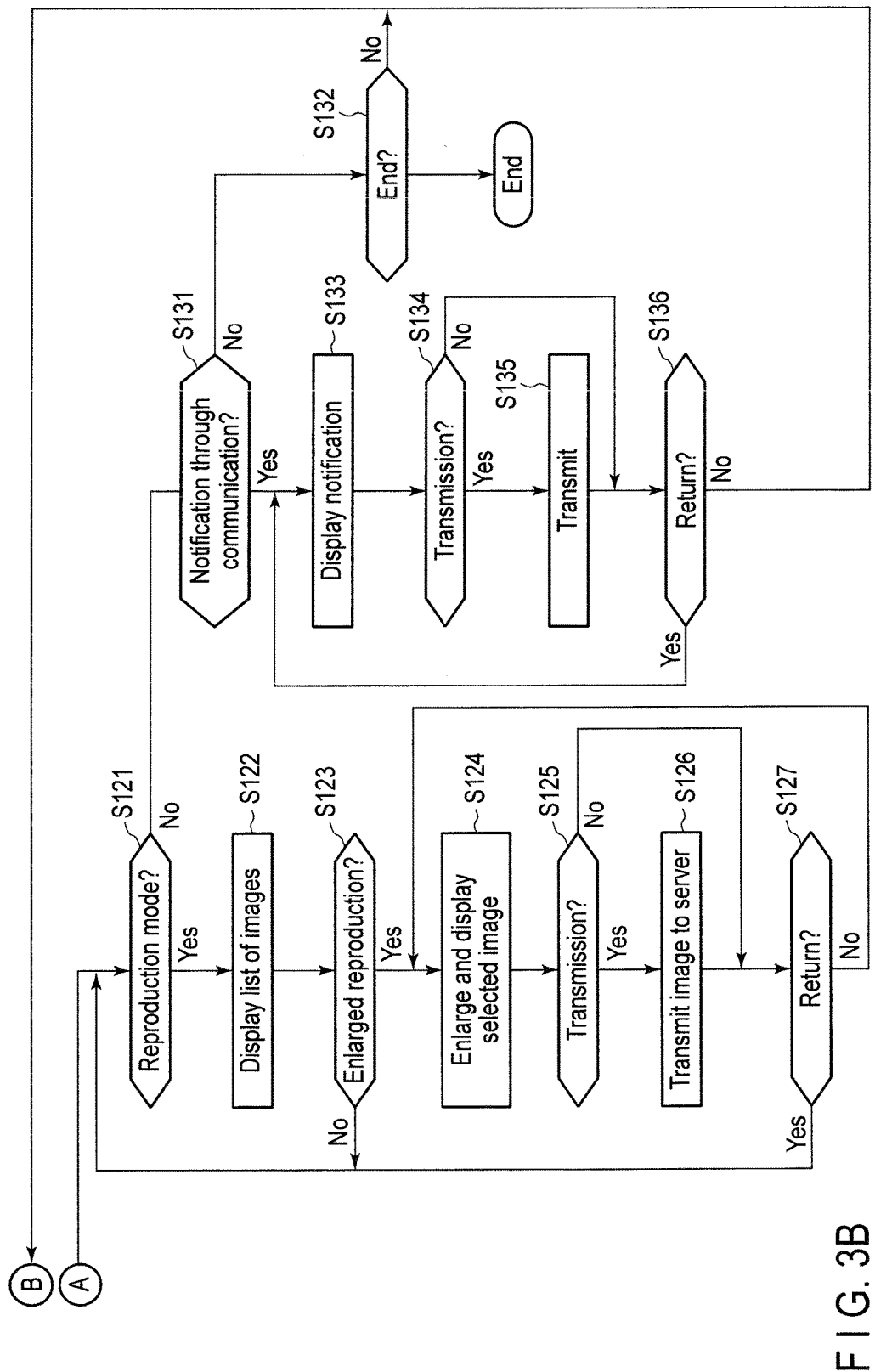
F I G. 3B

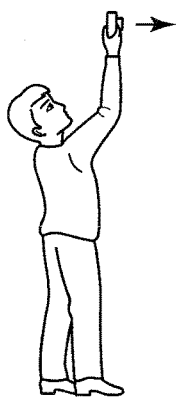
F I G. 6G
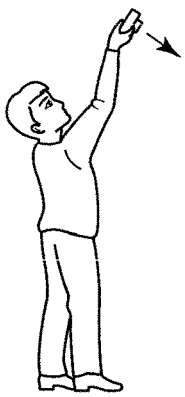
F I G. 6H
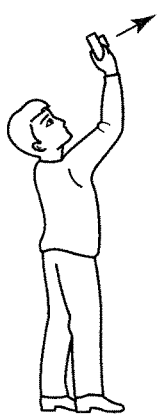
F I G. 6I

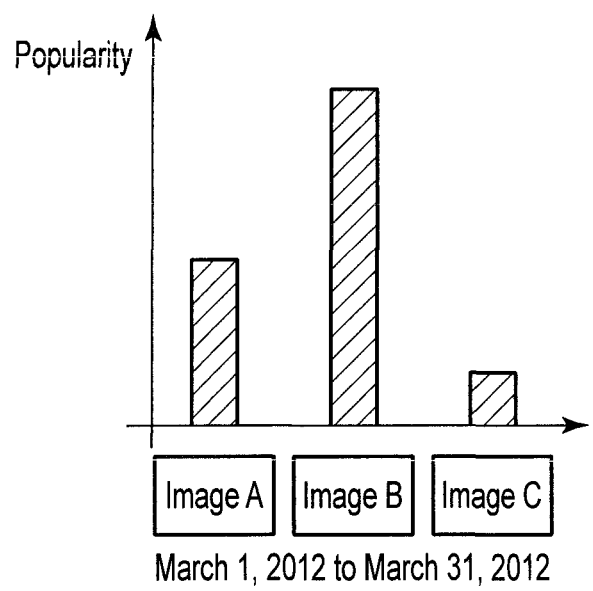
F I G. 11

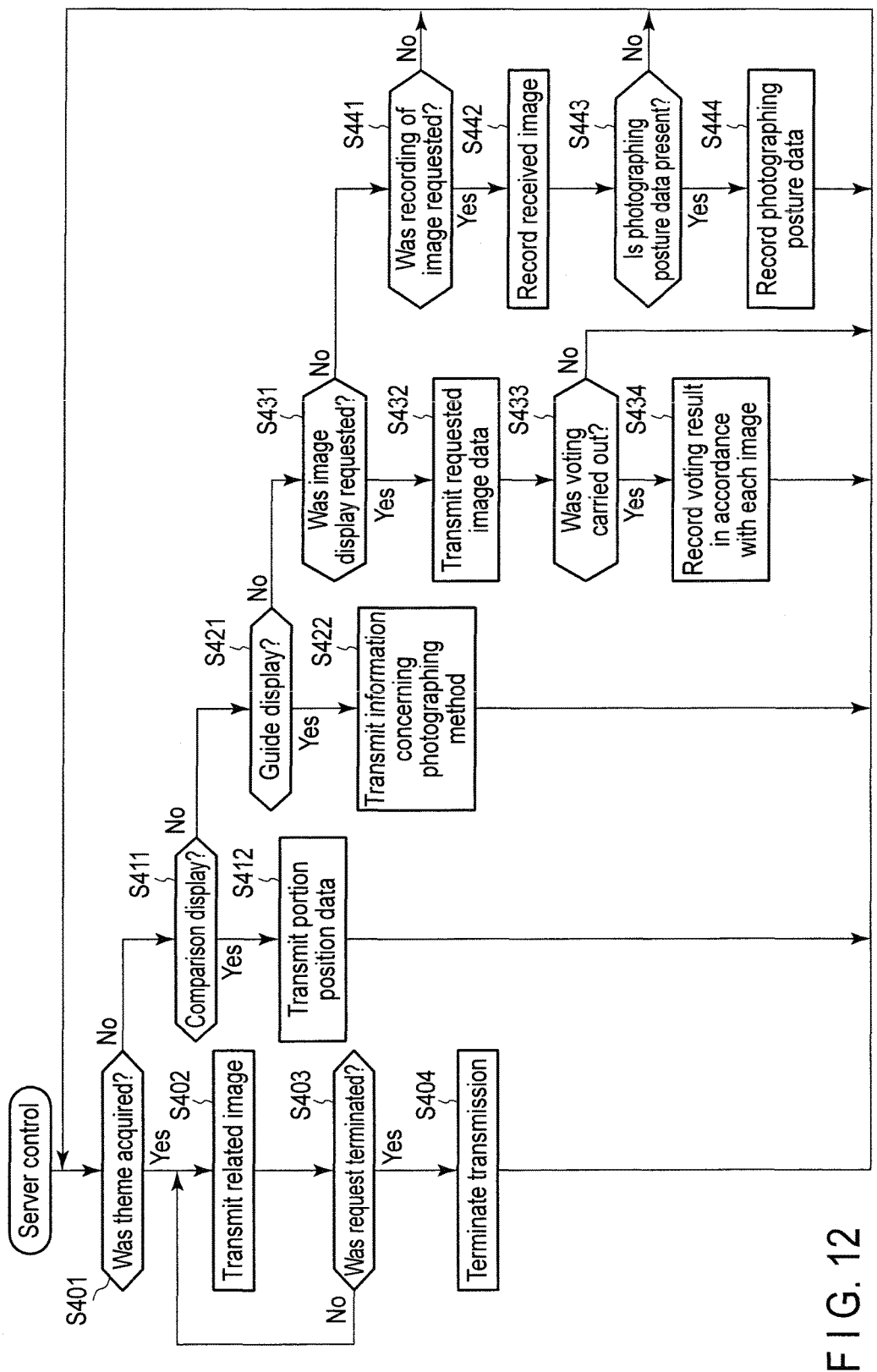
F I G. 12

IMAGING APPARATUS AND METHODS FOR GENERATING A GUIDE DISPLAY USING IMAGING HEIGHT POSTURE INFORMATION

CROSS-REFERENCE TO RELATED APPLICATIONS

This application is a continuation of U.S. patent application Ser. No. 14/956,812 (referred to as "the '812 application" and incorporated herein by reference), filed on Dec. 2, 2015, titled "IMAGING APPARATUS AND METHODS FOR GENERATING A GUIDE DISPLAY SHOWING A PHOTOGRAPHING TECHNIQUE FOR APPROXIMATING A COMPOSITION OF A SUBJECT IMAGE TO THAT OF A SAMPLE IMAGE" and listing Atsushi MARUYAMA, Kazuhiko SHIMURA, Takashi KOBIKI, and Osamu NONAKA, as the inventors, the '812 application being a continuation application of U.S. patent application Ser. No. 14/312,710 (referred to as "the '710 application" and incorporated herein by reference), filed on Jun. 24, 2014, titled "IMAGING APPARATUS AND METHODS FOR GENERATING A GUIDE DISPLAY SHOWING A PHOTOGRAPHING TECHNIQUE FOR APPROXIMATING A COMPOSITION OF A SUBJECT IMAGE TO THAT OF A SAMPLE IMAGE" listing Atsushi MARUYAMA, Kazuhiko SHIMURA, Takashi KOBIKI, and Osamu NONAKA, as the inventors, and issuing as U.S. Pat. No. 9,237,273 on Jan. 12, 2016, the '710 application being a Continuation Application of PCT Application No. PCT/JP2013/057297, filed on Mar. 14, 2013 and based upon and claiming the benefit of priority from prior Japanese Patent Application No. 2012-133096, filed on Jun. 12, 2012, the entire contents of all of which are incorporated herein by reference.

BACKGROUND OF THE INVENTION

1. Field of the Invention

The present invention relates to an imaging apparatus.

2. Description of the Related Art

A digital camera that presents advice for taking a well-composed picture has been known. For example, Jpn. Pat. Appln. KOKAI Publication No. 2011-135527 discloses a technology concerning a digital camera that presents a preferred composition in accordance with a scene that a user attempts to capture. For example, this digital camera has a composition evaluation unit and a composition presenting unit. The composition evaluation unit evaluates a composition of a sample image, and the composition presenting unit superimposes a composition highly evaluated by the composition evaluation unit on a live view display and presents it. For example, a position of a person or a position of a mountain is superimposed on a live view display and presented in a display unit.

BRIEF SUMMARY OF THE INVENTION

According to an aspect of the invention, a data processing apparatus (which may be included in an imaging apparatus) includes: an image acquisition circuit which acquires image data obtained by an imaging operation of an imaging apparatus; a photographing state determination circuit which acquires photographing posture data including information of an inclination and a height of the imaging apparatus at the time of the imaging operation; and a signal processing circuit which creates an image file including the image data and the photographing posture data.

According to another aspect of the invention, a display apparatus (which may be included in an imaging apparatus) includes: a display unit; a guide display generation circuit which acquires an image file including image data and photographing posture data including information of an inclination and a height of an imaging apparatus performing an imaging operation when the image data was created by the imaging operation to generate a photographing posture guide display based on the photographing posture data; and a display control circuit which causes the display unit to display an image based on the image data and the photographing posture guide display.

According to yet another aspect of the invention, a file creating method includes: acquiring image data obtained by an imaging operation of an imaging apparatus; acquiring photographing posture data including information of an inclination and a height of the imaging apparatus at the time of the imaging operation; and creating an image file including the image data and the photographing posture data.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a block diagram showing a configuration example of a digital camera according to a first embodiment;

FIG. 3B is a flowchart showing the example of the processing in the digital camera according to the first embodiment;

FIG. 6G is a view showing an example of the guide display in the digital camera according to the first embodiment;

FIG. 6H is a view showing an example of the guide display in the digital camera according to the first embodiment;

FIG. 6I is a view showing an example of the guide display in the digital camera according to the first embodiment;

FIG. 11 is a view showing an outline of an example of a totalization result of popularity voting for images according to the first embodiment;

FIG. 12 is a flowchart showing an example of processing executed by a server according to the first embodiment;

DETAILED DESCRIPTION OF THE INVENTION

First Embodiment

Figure 1B:
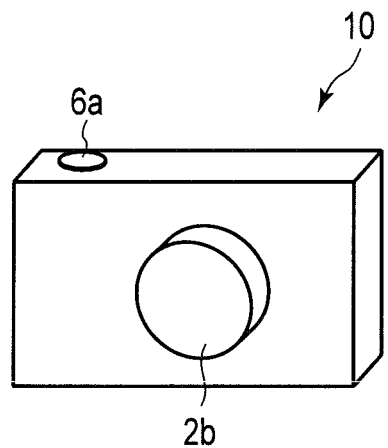
FIG. 1B shows an example of an exterior of the digital camera according to the first embodiment.
Figure 1C:
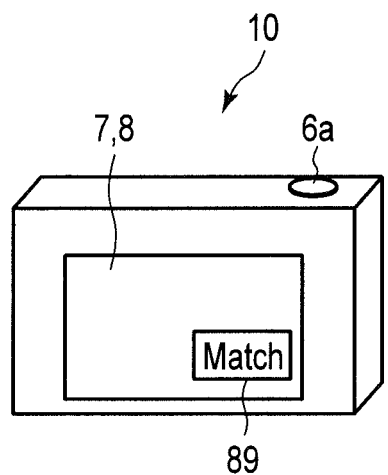
FIG. 1C shows an example of an exterior of the digital camera according to the first embodiment.

A first embodiment according to the present invention will now be described hereinafter with reference to the drawings. FIG. 1A shows an outline of a configuration example of a digital camera 10 according to this embodiment. Further, FIG. 1B and FIG. 1C show an example of an outline of an exterior of the digital camera 10. The digital camera 10 comprises a signal processing control unit 1, an imaging unit 2, a position sensor 3, a recording unit 4, a transmission/reception unit 5, an operation unit 6, a touch panel 7, a display unit 8, an acceleration sensor 9a, a geomagnetic sensor 9b, and an atmospheric pressure sensor 9c. The signal processing control unit 1 controls operations of respective units in the digital camera 10. Furthermore, the signal processing control unit 1 executes various kinds of arithmetic operations as will be described later.

The imaging unit 2 includes, e.g., a lens 2b, an imaging element, a processing circuit, and others. In the imaging unit 2, a subject image that has entered through the lens 2b is converted into an electrical signal by the imaging element, whereby an image signal is generated. The position sensor 3 is, e.g., a GPS unit and acquires a position of the digital camera 10. The recording unit 4 includes, e.g., a removable storage medium. The recording unit 4 records images acquired by the digital camera 10 or data concerning these images. Moreover, the recording unit 4 records sample images obtained through, e.g., the Internet or data concerning these sample images. Additionally, images and others may be recorded in the recording unit 4 in advance.

The transmission/reception unit 5 includes a wireless device configured to perform data communication with a server 50. The operation unit 6 includes a switch and receives inputs provided by various operations performed by a user. The operation unit 6 includes a release button 6a for still picture photographing that is arranged at a position where an operation using, e.g., an index finger of a right hand is enabled. When a user operates this release button 6a, the digital camera 10 can perform a photographing operation. Further, the operation unit 6 includes a switch, a dial, and other parts via which changes in photographing parameters, e.g., a shutter speed, an aperture, exposure correction, a sensitivity setting, a focal position, and the like are input.

The display unit 8 configured to display images includes, e.g., a liquid crystal display panel. The display unit 8 is provided on, e.g., a back side of the digital camera 10. The touch panel 7 is provided on the display unit 8. The touch panel 7 also receives input of instructions from a user. The user can operate the digital camera 10 by, e.g., touching a position corresponding to an icon displayed in the display unit 8.

The acceleration sensor 9a is a general triaxial acceleration sensor. The acceleration sensor 9a detects the gravity and outputs a signal indicative of an inclination of the digital camera 10. Furthermore, the acceleration sensor 9a can detect, e.g., a change in moving speed of the digital camera 10. The geomagnetic sensor 9b is a general geomagnetic sensor and outputs a signal indicative of a direction that the digital camera 10 faces. The atmospheric pressure sensor 9c is a general atmospheric pressure sensor and outputs a signal indicative of a change in height. The atmospheric pressure sensor 9c can detect a change in height with a resolution higher than approximately 3 cm.

The signal processing control unit 1 includes a signal processing unit 1a, a sample acquisition unit 1b, a theme determination unit 1d, a feature extraction unit 1e, a guide display generation unit 1f, a photographing state determination unit 1h, a distance determination unit 1i, a display control unit 1j, and a clock 1k. The signal processing unit 1a performs image processing and calculates a parameter for control such as control of the respective units other than the following various kinds of arithmetic operations or controls. Moreover, the signal processing unit 1a controls operations of the respective units in the digital camera 10. For example, the signal processing unit 1a combines image data obtained by an imaging operation, data representing a later-described photographing posture, and any other data to create an image file.

The sample acquisition unit 1b acquires a sample image. The sample acquisition unit 1b acquires, e.g., the sample image recorded in the server 50 with the use of the transmission/reception unit 5 through the Internet. The sample acquisition unit 1b has a retrieval unit 1c. The retrieval unit 1c retrieves, e.g., an image of interest from many images recorded in the server 50. Additionally, the sample acquisition unit 1b may acquire a sample image from, e.g., the recording unit 4. The theme determination unit 1d determines a theme of an image acquired by the imaging unit 2. The retrieval unit 1c retrieves a sample image in accordance with, e.g., a theme obtained by the theme determination unit 1d.

The feature extraction unit 1e extracts image features, e.g., a color, composition, a profile, and so on of an image acquired by the imaging unit 2. Further, the feature extraction unit 1e detects, e.g., a face in an image. The feature extraction unit 1e can determine a position of a face in an image and can also determine, e.g., how the face is inclined with respect to the front. The above-described image features are recorded as image feature data 4a in the recording unit 4. It is to be noted that the image feature data does not necessarily have to be recorded in the recording unit 4, and it may be recorded in, e.g., the server 50 connected through the Internet. Furthermore, the image feature data may be sequentially acquired from the server 50. It is to be noted that a sample image or its feature data may be recorded in the digital camera 10 in advance.

The guide display generation unit 1f generates a guide display showing a photographing method by utilizing a sample image acquired by the sample acquisition unit 1b. The guide display generation unit 1f includes a feature comparison unit 1g. The feature comparison unit 1g compares the features extracted by the feature extraction unit 1e with the image feature data recorded in the recording unit 4 or the image feature data acquired from the server 50 through the transmission/reception unit 5. The guide display generation unit 1f creates a view showing, e.g., a posture of a photographer at the time of photographing or how to hold the camera. Furthermore, the guide display generation unit 1f also creates an image showing a difference between, e.g., an image obtained by the imaging unit 2 and a sample image. Moreover, the guide display generation unit 1f creates character information or sound information representing a posture of a photographer, how to hold the camera, or a difference from a sample image.

The photographing state determination unit 1h determines a photographing state, e.g., a posture of a user at the time of photographing based on outputs from the position sensor 3, the acceleration sensor 9a, the geomagnetic sensor 9b, and the atmospheric pressure sensor 9c. The distance determination unit 1i determines a distance from the digital camera 10 to a subject based on, e.g., a focal position of the lens 2a. The display control unit 1j controls the display unit 8 and displays an image obtained by the imaging unit 2, image feature data or a display representing its similarity (e.g., a display 89 in FIG. 1C), a guide display at the time of photographing, and others. The clock 1k outputs a time required for recording a photographing time or the like in association with an image.

Figure 2A:
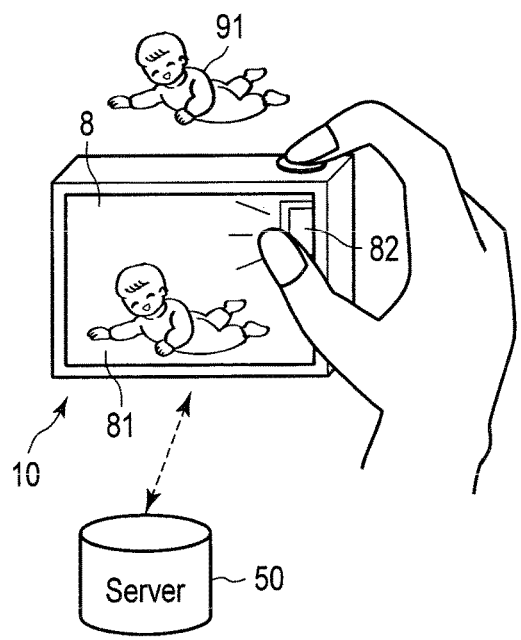
FIG. 2A is a view showing an outline of an example of an operation of the digital camera according to the first embodiment.

An outline of an operation of the digital camera 10 according to this embodiment will now be described with reference to FIG. 2A to FIG. 2D. In this embodiment, as shown in FIG. 2A, the digital camera 10 is pointed at an arbitrary subject 91 by a user to carry out photographing. At this time, an image acquired by the imaging unit 2 is displayed in the display unit 8 as a through image 81. The signal processing control unit 1 of the digital camera 10 determines a theme of the image acquired by the imaging unit 2 and transmits this theme to the server 50 through the transmission/reception unit 5.

The server 50 selects a picture that matches the theme of the image received from the digital camera 10. For example, as shown in FIG. 2A, the server 50 transmits a selected picture to the digital camera 10. The digital camera 10 that has received the picture from the server 50 displays a tab 82 which is part of the picture in an end portion of the display unit 8. As a position at which this tab 82 is displayed, it is preferable to adopt a position of a thumb of a right hand of the user who holds the digital camera 10 having the release button 6a of the operation unit 6 on which an index finger of the right hand is placed.

Figure 2B:
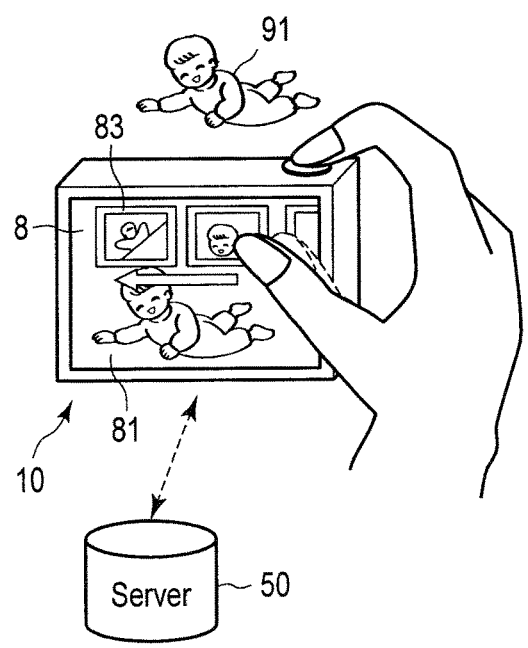
FIG. 2B is a view showing an outline of the example of the operation of the digital camera according to the first embodiment.
Figure 2C:
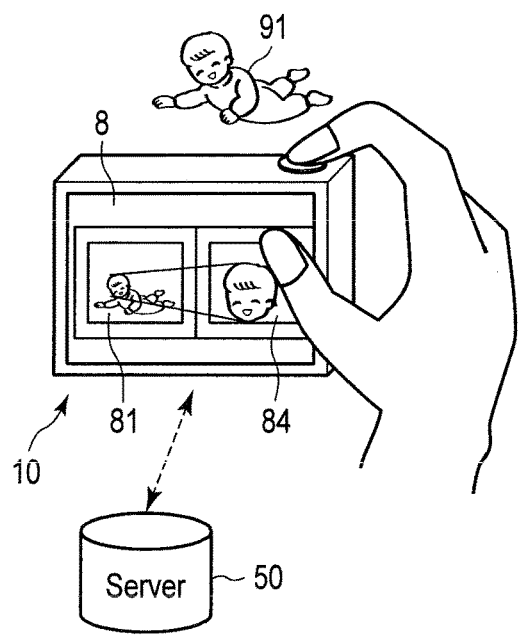
FIG. 2C is a view showing an outline of the example of the operation of the digital camera according to the first embodiment.

As shown in FIG. 2B, when the user slides his/her finger on the touch panel 7 to draw out the tab 82 toward the central side of the display unit 8, the digital camera 10 sequentially displays thumbnail images 83 of pictures received from the server 50 in the display unit 8. When the user selects one of these thumbnail images 83, the digital cameras 10 aligns and displays the through image 81 of the image acquired by the imaging unit 2 and a sample image 84 selected by the user in the display unit 8 as shown in FIG. 2C. When the user further makes a request, the digital camera 10 performs comparative display. In the comparative display, for example, as shown in FIG. 2C, corresponding positions of the through image 81 and the sample image 84 are connected with each other through, e.g., a line. The comparative display is not restricted thereto, and it is possible to adopt various kinds of displays as long as they show the through image 81 and the sample image 84 by comparison.

Figure 2D:
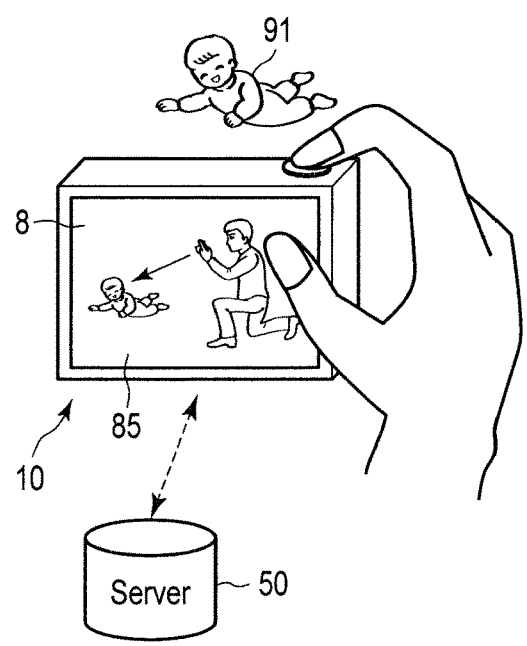
FIG. 2D is a view showing an outline of the example of the operation of the digital camera according to the first embodiment.

Further, when a user makes a request, the digital camera 10 performs a guide display as shown in, e.g., FIG. 2D. In the guide display, to obtain such an image like the sample image 84, a guide image 85 showing a how to perform photographing is displayed in the display unit 8. This guide image 85 comprehensively shows what posture and what direction should be taken with respect to a subject in order to perform photographing as an image. In the present invention, showing a comprehensible advice display is one theme. Based on such a display, a photographer can perform the same photographing as a sample that should be photographed immediately.

Figure 3A:
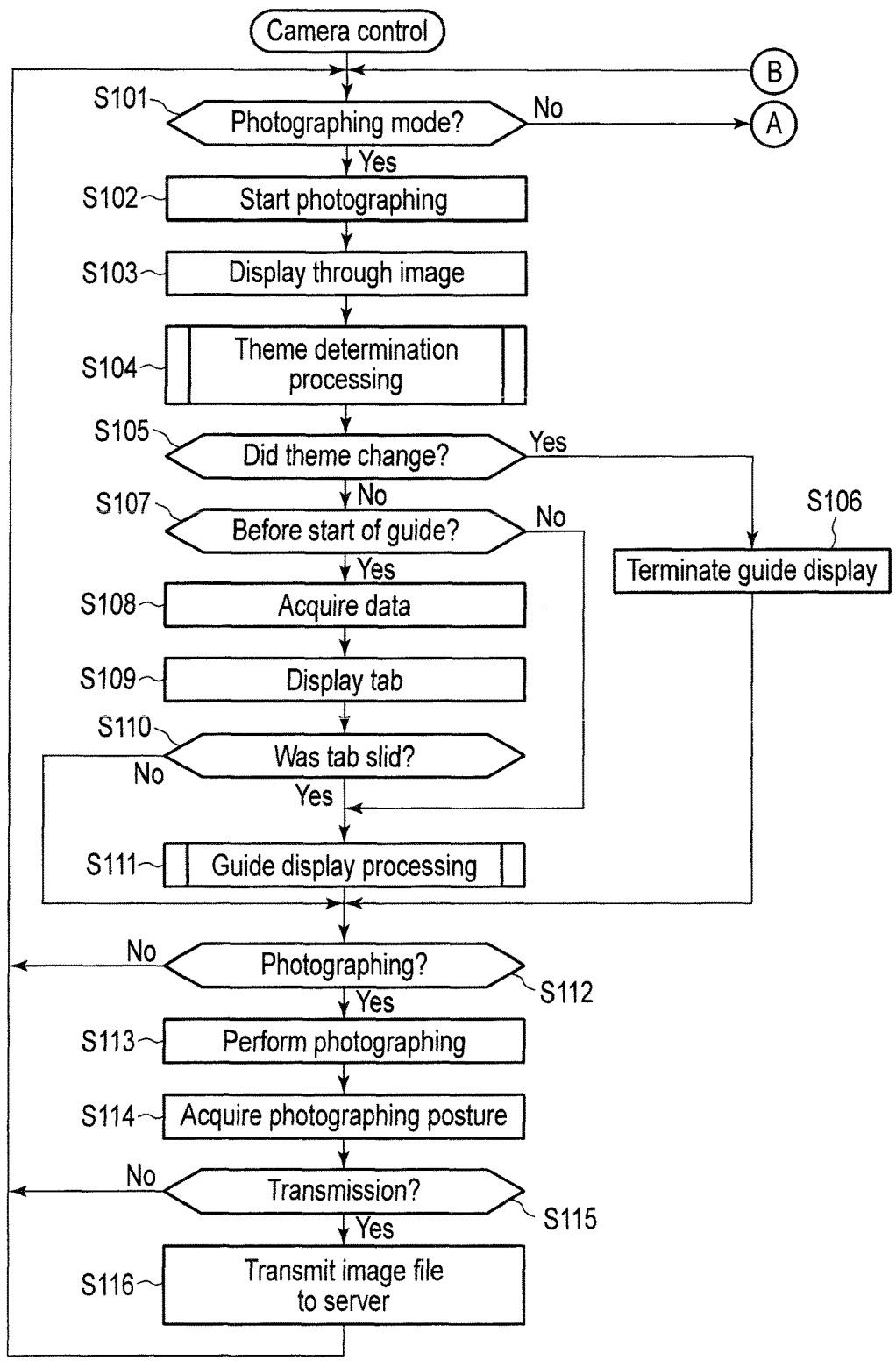
FIG. 3A is a flowchart showing an example of processing in the digital camera according to the first embodiment.

An example of processing in this embodiment will now be described with reference to flowcharts shown in FIG. 3A and FIG. 3B. At step S101, the signal processing control unit 1 determines whether a photographing mode is currently set. In the case of the photographing mode, the signal processing control unit 1 starts a photographing operation at step S102. That is, the signal processing control unit 1 starts to acquire an image signal from the imaging unit 2. Further, when the photographing operation is started, a sampling rate of atmospheric pressure determination is raised, thereby improving an accuracy of height information to be acquired. At step S103, the signal processing control unit 1 displays a through image in the display unit 8. That is, the signal processing control unit 1 sequentially displays images acquired from the imaging unit 2 in the display unit 8.

At step S104, the signal processing control unit 1 executes theme determination processing. This theme determination processing is processing of determining a theme of a through image acquired by the imaging unit 2 and displayed in the display unit 8. An example of the theme determination processing will be described with reference to a flowchart shown in FIG. 4. It is needless to say that situational analysis improves when the theme is more finely detailed, and a sample image that should be used as a reference can be accurately determined. For example, in the case of photographing a picture of a baby, even if a portrait picture of a woman is presented as a sample, it may not serve as a useful reference. Thus, the theme determination processing is configured to enable determining a subject or a photographing scene that is frequently photographed.

At step S201, the signal processing control unit 1 determines whether a face is included in an image. If it was determined that the face was included, the signal processing control unit 1 determines whether the face is solely present in a central portion of the image at step S202. If it was determined that the face was solely present in the central portion in the image in this determination, the signal processing control unit 1 determines whether the face is a baby's face at step S203. If the face was determined to be a baby's face, the signal processing control unit 1 determines that the theme of the image is a "baby" at step S204. Then, the theme determination processing is terminated, and the processing returns to step S104.

If the face was not determined to be a baby's face in the determination of step S203, the processing advances to step S205. At step S205, the signal processing control unit 1 determines whether the face included in the image is a child's face. If the face was determined to be a child's face, the signal processing control unit 1 determines the theme of the image is a "child" at step S206. Thereafter, the theme determination processing is terminated, and the processing returns to step S104. If the face was not determined to be a child's face in the determination of step S205, the processing advances to step S207. At step S207, the signal processing control unit 1 determines whether the face included in the image is a woman's face. If the face was determined to be a woman's face, the signal processing control unit 1 determines that the theme of the image is a "woman" at step S208. Then, the theme determination processing is terminated, and the processing returns to step S104. If the face was not determined to be a woman's face in the determination of step S207, the processing advances to step S209. At step S209, the signal processing control unit 1 determines that the theme of the image is a "regular person's portrait". Thereafter, the theme determination processing is terminated, and the processing returns to step S104.

If the face was not determined to be solely present in the central portion of the image at step S202, the processing advances to step S211. At step S211, the signal processing control unit 1 determines whether the face corresponds to faces of a pair of a man and a woman. If the face was determined to be faces of a pair of a man and a woman, the signal processing control unit 1 determines whether wedding clothes are included in the image at step S212. If the wedding clothes were determined to be included, the signal processing control unit 1 determines that the theme of the image is a "wedding" at step S213. Subsequently, the theme determination processing is terminated, and the processing returns to step S104. If the wedding clothes were not determined to be included in the determination of step S212, the processing advances to step S214. At step S214, the signal processing control unit 1 determines that the theme of the image is a "couple". Then, the theme determination processing is terminated, and the processing returns to step S104. If it the face was not determined to be faces of a pair of a man and a woman in the determination of step S211, the processing advances to step S215. At step S215, the signal processing control unit 1 determines that the theme of the image is a "regular group of persons". Subsequently, the theme determination processing is terminated, and the processing returns to step S104.

A wedding ceremony or the like is a very popular photographic scene that general users have many opportunities to photograph. Therefore, the wedding ceremony or the like should be accurately determined. At this time, since a custom or a costume differs depending on each country or region, ingenuity may be exercised so that classification can be carried out in accordance with each region. Further, as an example similar to the wedding ceremony, there is an athletic meet or a culture festival, but a description thereof is omitted here. Classification may be carried out based on not only distances or images but also seasons or events from regional information or clock information using ambient sound or GPS information.

If the face was not determined to be included in the determination of step S201, the processing advances to step S221. The signal processing control unit 1 determines whether a subject is distant at step S221. If the subject was determined to be distant, the signal processing control unit 1 determines that the theme of the image is a "landscape of a place or a season" at step S222. Subsequently, the theme determination processing is terminated, and the processing returns to step S104. If the subject was not determined to be distant in the determination of step S221, the processing advances to step S223. At step S223, the signal processing control unit 1 determines that the theme of the image is a "landscape of animals and plants" at step S223. Then, the theme determination processing is terminated, and the processing returns to step S104.

Here, to simplify the description, broad categories are explained here, but the present invention is not restricted thereto. It is needless to say that, as the "landscape of animals and plants" determined at step S223, images should be further finely classified so that whether macro photography is adopted, an angle that provides the best appearance when, e.g., a plant or an insect is a subject, an action when an animal or the like is a subject, and other aspects can be presented to a user. As to the "landscape of a place or a season", there are various popular themes such as a picture of trains or a picture of stars. It is also needless to say that these themes should be finely classified.

Depending on the image theme, it can be difficult for general users to perform photography. For example, a landscape of sunrise or sunset or a landscape of reflection of sunlight on a surface of water requires a highly advanced camera technique. For example, to appropriately photograph reflection on a surface of water, a position of a camera is important. In such a case, a value of information of a photographing posture is very high. Furthermore, in macro photography or photography of a pet, to appropriately face a subject, information of a posture is very important. To appropriately present a photographing posture having a high value as described above, adequately selecting a theme of an image is important.

Figure 4:
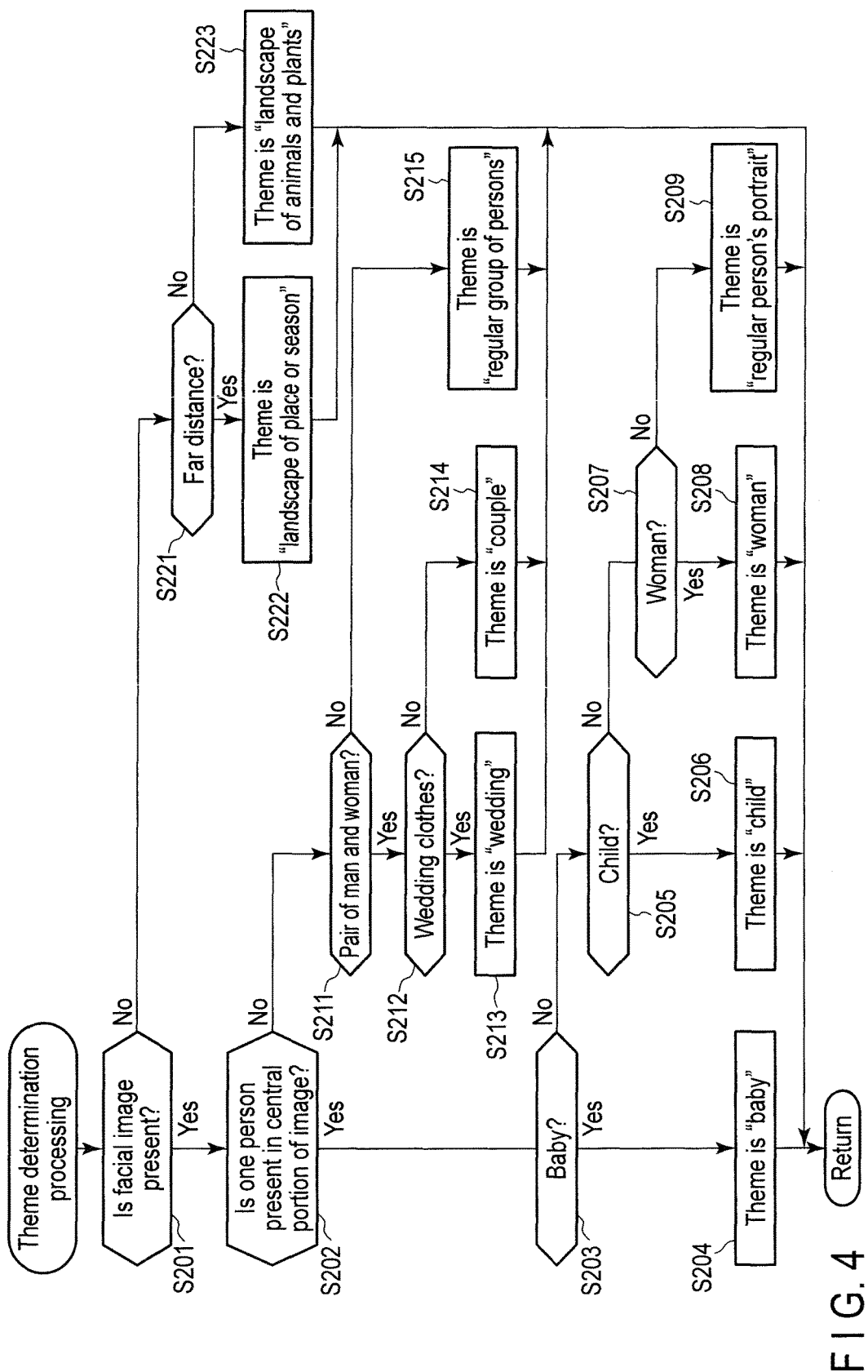
FIG. 4 is a flowchart showing an example of theme determination processing in the digital camera according to the first embodiment.

Each theme described with reference to FIG. 4 is just an example, and any other theme may be set as a matter of course. The theme determination method described above is just an example, and the present invention is not restricted thereto; any method that can determine a theme can be used. Besides sounds, positions, and times described above, various image dictionaries may be prepared. Features of images such as a color or shading may be used. Types of flowers or insects may be designated. Moreover, map information may be used and, for example, when a position is along a railway, a picture may be classified as a picture of trains. When a position is a wedding center, a picture may be classified as a wedding. When a position is a concert hall, a picture may be classified as a concert. When a position is a school, a picture may be classified as a school event. A user may be allowed to input a theme by inputting a sound, selecting an icon, or inputting a character as a matter of course. Although the example of determining a theme after holding a camera has been described here, a sample that a user might want to see may be set to some extent before photographing, e.g., on the way to an event site by train. In the case of a wedding ceremony or the like, the content of an event can be predicted and prepared before arriving at a hall, and hence retrieving a sample image may be enabled beforehand.

Again referring to FIG. 3A, the description will continue. At step S105, the signal processing control unit 1 determines whether a theme determined by the theme determination processing has changed. If the theme has changed, the signal processing control unit 1 terminates the guide display that is being displayed at step S106. Then, the processing advances to step S112. If the theme was not determined to have changed at step S105, the processing advances to step S107.

At step S107, the signal processing control unit 1 determines whether the guide display is yet to start. If the guide display was not determined to be yet to start, i.e., if the guide display was determined to have already started, the processing advances to step S111. If the guide display was determined to be yet to start at step S107, the processing advances to step S108. At step S108, the signal processing control unit 1 transmits the theme determined by the theme determination processing to the server 50 and acquires a sample image group concerning this theme. At step S109, the signal processing control unit 1 displays the tab 82 in the display unit 8 as shown in FIG. 2A by using the sample image acquired from the server 50.

At step S110, the signal processing control unit 1 determines whether the touch panel 7 on the tab 82 displayed in the display unit 8 was slid toward the central direction of the touch panel 7. If the touch panel 7 was not determined to have been slid, the processing advances to step S112. If it was determined to have been slid at step S110, the processing advances to step S111.

At step S111, the signal processing control unit 1 executes guide display processing. This guide display processing is processing for performing, e.g., such guide processing as shown in FIG. 2C and FIG. 2D. An example of the guide display processing will now be explained with reference to a flowchart shown in FIG. 5. At step S301, the signal processing control unit 1 determines whether a user selected a comparison mode. If the comparison mode was not determined to have been selected, the signal processing control unit 1 determines whether the touch panel 7 was touched and an image was selected at step S302.

If the touch panel 7 was determined to have not been touched, the signal processing control unit 1 sequentially displays thumbnail images of sample images at step S303. That is, the thumbnail images are sequentially displayed in the display unit 8 as if they flow in a direction along which a user slid at step S110. At step S304, the signal processing control unit 1 determines whether all thumbnail images were displayed. If all the thumbnail images were determined to have not been displayed, the guide display processing is terminated, and the processing returns to step S111 described with reference to FIG. 3A.

If all the thumbnail images were determined to have been displayed at step S304, the processing advances to step S305. At step S305, the signal processing control unit 1 determines whether communication with the server 50 is possible. If the communication was determined to be possible, the signal processing control unit 1 further acquires sample images from the server 50 at step S306. Then, the guide display processing is terminated, and the processing returns to step S111. If the communication was determined to be impossible at step S305, the processing advances to step S307. At step S307, the signal processing control unit 1 repeats the display from a first thumbnail image. Then, the guide display processing is terminated, and the processing returns to step S111.

If the touch panel 7 was determined to have been touched at step S302, the signal processing control unit 1 displays a touched sample image in the display unit 8 at step S308. At step S309, the signal processing control unit 1 determines whether the comparison mode was selected. If the comparison mode was determined to have been selected, the signal processing control unit 1 sets a flag for setting the comparison mode to the comparison mode at step S310. Subsequently, the guide display processing is terminated, and the processing returns to step S111. If the comparison mode was determined to have not been selected at step S309, the guide display processing is terminated, and the processing returns to step S111.

If the comparison mode was determined to have been selected at step S301, the processing advances to step S311. At step S311, the signal processing control unit 1 determines whether the current mode is a guide display mode. If the current mode is not the guide display mode, the signal processing control unit 1 performs a comparative display in the display unit 8 at step S312. In the comparative display, for example, as shown in FIG. 2C, a through image that is being acquired and a sample image are aligned and displayed. Further, corresponding portions of these images, e.g., edges of faces are connected through a line and displayed. Furthermore, for example, a direction of a face may be displayed. Moreover, a rotating direction may be indicated by an arrow. Based on such a display, the user can readily understand a difference between the through image and the sample image. Besides such a display example, a difference may be displayed by using, e.g., a moving image, morphing, showing illustrations, or avatars, as long as relevance can be visually confirmed.

Subsequently, at step S313, the signal processing control unit 1 determines whether the guide display mode has been requested. If the guide display mode has not been requested, the guide display processing is terminated, and the processing returns to step S111. If the guide display mode has been selected at step S313, the processing advances to step S314. At step S314, the signal processing control unit 1 sets a flag for setting the guide display mode to the guide display mode. Then, the guide display processing is terminated, and the processing returns to step S111.

When it is determined that current mode is the guide display mode at step S311, the processing advances to step S315. At step S315, the signal processing control unit 1 displays a photographing method when the selected sample image was acquired in the display unit 8 by using, e.g., drawings.

As the guide display, for example, such images as shown in FIG. 6A to FIG. 6I are displayed. For example, drawings that show a photographer holding the camera near his/her face while standing, like in FIG. 6A, FIG. 6B, and FIG. 6C, a photographer holding the camera while kneeling, like in FIG. 6D, FIG. 6E, and FIG. 6F, or a photographer holding the camera raised up, like in FIG. 6G, FIG. 6H, and FIG. 6I. Further, for example, drawings show that the photographer held the camera horizontally, like in FIG. 6A, FIG. 6D, and FIG. 6G, the photographer held the camera in a direction looking down, like in FIG. 6B, FIG. 6E, and FIG. 6H, or that the photographer held the camera in a direction looking up, like in FIG. 6C, FIG. 6F, and FIG. 6I.

Further, the signal processing control unit 1 can display figures representing information that the photographer took a picture while lying on his/her belly, that the photographer took a picture while panning the camera, or that the photographer held the camera in a vertical position or a horizontal position in the display unit 8. Moreover, for example, as shown in FIG. 2D, an image showing a posture of the photographer may be combined with a through image including a subject and displayed. As described above, for example, a position of the camera with respect to the photographer is shown by each display, and the user can easily understand the photographing method for sample images.

In the case of photographing Mt. Fuji reflected on the surface of water, photographing while lying on one's belly is recommended, but even though general users may not be aware of such an unnatural posture, they will be able to perform photography like professionals in no time. However, according to the posture graphic display of the photographing method or the body position display at the time of photographing, techniques can be easily presented to users.

Figure 6A:
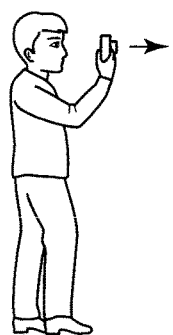
FIG. 6A is a view showing an example of guide display in the digital camera according to the first embodiment.

Furthermore, when the difficulty level information of the various kinds of postures is additionally provided to the sample images, effort is not wasted on determining that a given posture, state, or tool to be used cannot be adopted. For example, there is a case that photographing while lying on one's belly is impossible, depending on clothes the photographer is wearing. Moreover, photographing using a tool is difficult if the photographer does not have the tool, and photographing while stretching out has a high difficulty level, depending on the photographer's height. As described above, it is important to convert a difficulty level into a numerical value in accordance with each posture and associate and record the converted value. For example, a difficulty level is low when the camera is held near the photographer's face while the photographer is standing, like in FIG. 6A, FIG. 6B, and FIG. 6C (for example, the difficulty level is set to 1), and the difficulty level increases depending on what the photographer is wearing when the camera is held while the photographer is kneeling, like in FIG. 6D, FIG. 6E, and FIG. 6F, and hence the difficulty level may be set to 2. Additionally, imitating, e.g., a photographer who is holding the camera raised, like in FIG. 6G, FIG. 6H, and FIG. 6I is difficult, depending on one's height or clothes, and the difficulty level is set to 3 in this case, and the difficulty level is set to 4 in the case of lying on one's belly, and the difficulty level is set to, e.g., 5 in the case of using a tool. The difficulty level may be set to 3 when the tool is easily available as a matter of course. It is to be noted that FIG. 6A to FIG. 6I show drawings to aid the description, and these drawings may be formed into icons as avatar information as they are so that they can function as posture information (guide information). Each of such icons may be added to each acquired image.

Further, at step S316, the signal processing control unit 1 displays a difference between the current photographing method and the sample image photographing method in the form of characters. For example, when a user is currently holding the camera while standing whereas a selected sample image is acquired while the photographer is kneeling, for example, "photographing was performed while squatting down" is displayed. Furthermore, the sample image photographing method may be presented to a user by using sounds. Subsequently, the guide display processing is terminated, and the processing returns to step S111.

A description will now be given as to a method of recognizing a current photographing posture of a user by the digital camera 10. It is needless to say that a body position in which photographing was performed may be manually selected from a list of photographing body positions, but automatically recording each body position is very convenient in the case of taking many pictures. As described above, the acceleration sensor 9a, the geomagnetic sensor 9b, and the atmospheric pressure sensor 9c are provided to the digital camera 10. The photographing state determination unit 1h of the signal processing control unit 1 acquires how a user holds the digital camera 10, a posture of the digital camera 10, and other items based on outputs from these sensors. For example, an inclination of the digital camera 10 relative to a horizontal plane can be acquired by calculating the direction of gravity by the photographing state determination unit 1h based on an output from the acceleration sensor 9a. For example, rotation of the digital camera 10 on the horizontal plane can be acquired by calculating a direction relative to terrestrial magnetism by the photographing state determination unit 1h based on an output from the geomagnetic sensor 9b. For example, a vertical height of the digital camera 10 can be acquired based on an output from the atmospheric pressure sensor 9c.

Figure 7:
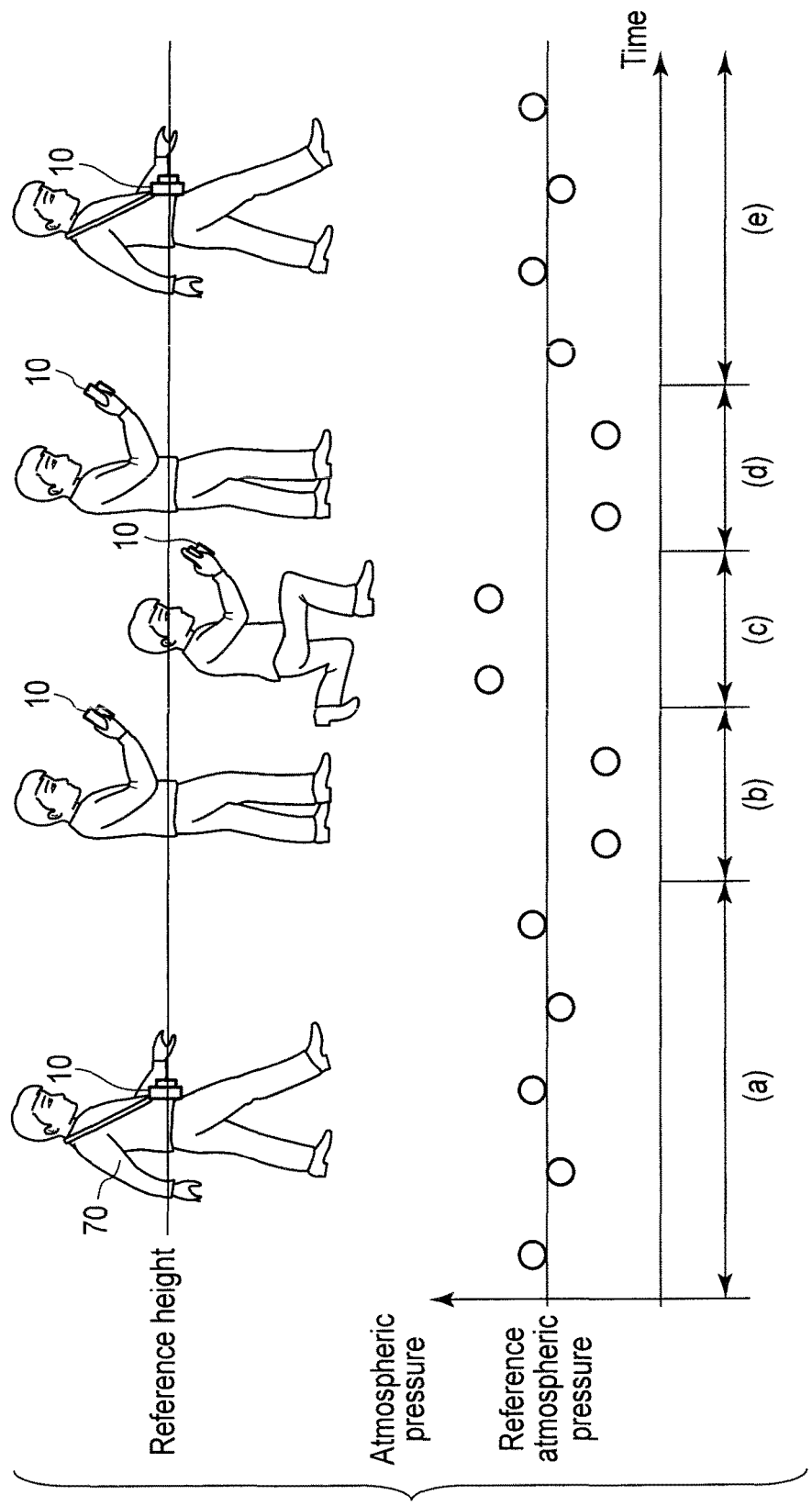
FIG. 7 is a view for explaining an example of a relationship between an output from an atmospheric pressure sensor and a position of the camera relative to a photographer according to the first embodiment.

A method of calculating a vertical height of the digital camera 10 using the atmospheric pressure sensor 9c will now be further described with reference to FIG. 7. The atmospheric pressure sensor 9c outputs a value indicative of an atmospheric pressure. The photographing state determination unit 1h acquires this atmospheric pressure and calculates a change in vertical height from a change in this atmospheric pressure. In FIG. 7, outputs from the atmospheric pressure sensor 9c are schematically shown on a lower side, and a relationship between a posture of a user 70 and a position of the digital camera 10 at each moment is schematically shown on an upper side.

For example, when the user 70 carries the digital camera 10 with him/her, the digital camera 10 is generally present at a position lower than a face of the user 70. Furthermore, when the user 70 carries the digital camera 10 with him/her, the digital camera 10 vibrates up and down in accordance with footsteps of the user 70. Thus, when outputs from the atmospheric pressure sensor 9c periodically fluctuate up and down like a period (a) shown in FIG. 7, the photographing state determination unit 1h determines that the user 70 is walking. It is to be noted that the vibration when the user 70 is walking may be acquired by using outputs from the acceleration sensor 9a in place of outputs from the atmospheric pressure sensor 9c. Moreover, the vibration when the user 70 is walking may be detected by using both the atmospheric pressure sensor 9c and the acceleration sensor 9a. The photographing state determination unit 1h sets an output from the atmospheric pressure sensor when the user 70 was determined to be walking as a reference atmospheric pressure at a position lower than the face.

When the user 70 turns on a power supply or performs an operation in the digital camera 10, the user 70 generally moves the digital camera 10 to be closer to his/her face to confirm an operating portion like a period (b) shown in FIG. 7. At this time, since the digital camera 10 is raised, an output from the atmospheric pressure sensor 9c is decreased. A relationship between the precedently acquired reference atmospheric pressure and a height of the face is calibrated based on a change in output from the atmospheric pressure sensor 9c.

Then, when the user 70 performs photographing like a period (c) shown in FIG. 7, the vibration of the camera stops. The photographing state determination unit 1h acquires this stop of the vibration based on outputs from the atmospheric pressure sensor 9c or the acceleration sensor 9a. The photographing state determination unit 1h compares an output from the atmospheric pressure sensor 9c at this moment with the calibrated reference atmospheric pressure and estimates a posture of the user 70 at the time of photographing with respect to a posture of the user 70 at the time of walking. In the example shown in FIG. 7, outputs from the atmospheric pressure sensor 9c are higher than the reference atmospheric pressure. Based on this state, the photographing state determination unit 1h estimates that the user 70 is photographing while squatting down.

After the photographing, the digital camera 10 is moved closer to the face when the digital camera 10 is operated like a period (d) shown in FIG. 7. When the user 70 again starts to walk like a period (e) shown in FIG. 7, outputs from the atmospheric pressure sensor 9c or outputs from the acceleration sensor again fluctuate. At this time, the digital camera 10 is considered to be provided at a position lower than the face of the user 70. As described above, the photographing state determination unit 1h estimates a posture of the user based on a relationship between a series of movements of the digital camera 10 and a change in output from the atmospheric pressure sensor 9c at this moment.

Figure 8A:
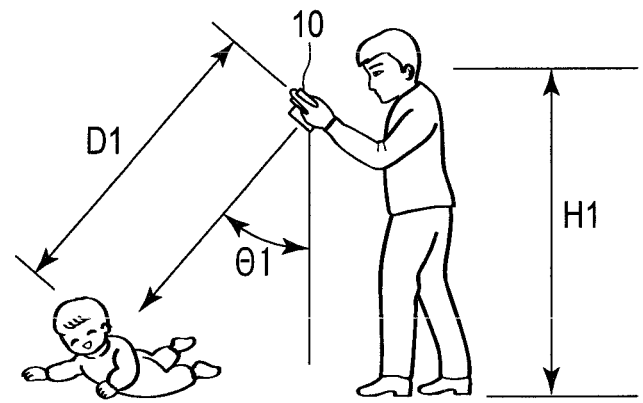
FIG. 8A is a view for explaining an example of posture information according to the first embodiment.
Figure 8B:
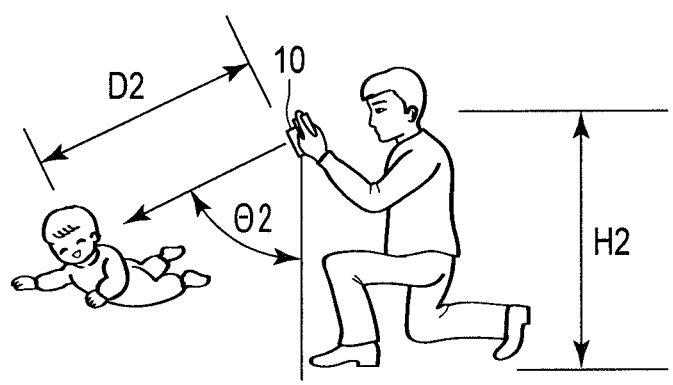
FIG. 8B is a view for explaining an example of the posture information according to the first embodiment.

Additionally, when a distance to a subject acquired in an autofocus (AF) operation is also used besides outputs from the acceleration sensor 9a, the geomagnetic sensor 9b, and the atmospheric pressure sensor 9c, parameters concerning such photographing states as shown in FIG. 8A and FIG. 8B can be obtained. That is, the photographing state determination unit 1h can obtain a height H1 and an inclination angle Θ1 of the digital camera 10 and a distance D1 from the digital camera 10 to a subject in the case of photographing in a standing position while looking down on the subject as shown in FIG. 8A. Further, the photographing state determination unit 1h can obtain a height H2 and an inclination angle Θ2 of the digital camera 10 and a distance D2 from the digital camera 10 to a subject in the case of photographing in a squatting position as shown in FIG. 8B. The signal processing control unit 1 can use, e.g., figures like FIG. 8A and FIG. 8B in the guide display. When such figures are used for the guide display, the user can readily understand a positional relationship between the subject and the digital camera 10.

Here, although the example where a body position and a posture are automatically detected has been described, this detection may be semi-automatically carried out as a matter of course, and a difference from a photographing posture designated by a photographer at the beginning may be determined by various sensors. For example, an atmospheric pressure or an acceleration may be used to determine from the difference that the posture has been changed. Alternatively, since many pictures may be taken in the same posture in some situations, a first designated body position can be used as photographing posture data as it is. In particular, as there are cases in which photographing is carried out using various tools such as a tripod, use of tools may be recorded rather than performing automatic determination in such a case. Input via sounds or touch may be used for the designation.

Again referring to FIG. 3A, the description will be continued. At step S112, the signal processing control unit 1 determines whether the release button was pressed to input a photographing operation. If the photographing operation was determined to have not been input, the processing returns to step S101. On the other hand, if the photographing operation was determined to have been input at step S112, the processing advances to step S113. At step S113, the signal processing control unit 1 allows the imaging unit 2 to perform an imaging operation. The imaging unit 2 converts a subject image into an electrical signal and creates an image signal.

As photographing posture data, such pictograms as shown in FIG. 6A to FIG. 6I for the explanation may be formed and used as icons that represent avatar information. These icons may be used so that a photographer can intuitively recognize a posture at the time of photographing. That is, icons may be combined and displayed as guide information or help display at the time of image reproduction or reproduction.

Figure 6B:
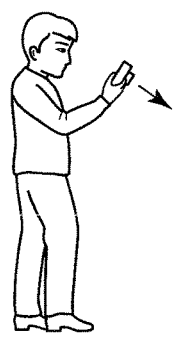
FIG. 6B is a view showing an example of the guide display in the digital camera according to the first embodiment.
Figure 6C:
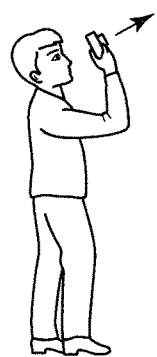
FIG. 6C is a view showing an example of the guide display in the digital camera according to the first embodiment.

For example, when a photographer holds the camera near his/her face in a standing state like FIG. 6A, FIG. 6B, and FIG. 6C, there is generated an icon in which a circular portion representing a face is arranged on a vertically long figure representing an upright body as an image of a photographing posture and the camera is arranged in front of the circular portion. Furthermore, when the photographer holds the camera while squatting down, like in FIG. 6D, FIG. 6E, and FIG. 6F, there is produced an icon in which the circular portion representing the face is arranged on a triangular figure representing a squatting body and the camera is arranged in front of the circular portion. Moreover, in the case of such a photographing posture as shown in FIG. 6G, FIG. 6H, and FIG. 6I, there is generated an icon in which the circular portion representing the face is arranged on the vertically long figure representing the upright body and the camera is arranged at a position that is obliquely above the circular portion. When a posture in which the photographer is lying on his/her belly is adopted, there is created an icon in which the circular portion representing the face is arranged in front of a horizontally long figure representing a body lying on his/her belly and the camera is arranged in front of the circular portion.

The photographing posture data may be provided by recording an image created in a simplified manner as described above or by recording information that enables forming such an image. A direction along which the camera is sighted may be indicated by an arrow, as shown in FIG. 6A to FIG. 6I.

According to an image file having such an icon display added thereto, a viewer can be aware of a situation where photographing was performed. Therefore, a level of appreciation may also increase for those who did not take the picture. For example, when there is information such as "photographing while lying on his/her belly", it can be understood that this picture is an image acquired with difficulty, and the true value can increase. Therefore, an image having such posture data is also effective in a display apparatus that displays such an image.

Data that is recorded in an image file does not necessarily have to be an icon, and it may be a text, character information, or encoded information that represents a photographing posture. The display apparatus that displays a photographing image having posture information obtained at the time of photographing reads an auxiliary display that is displayed in the form of characters or an icon representing the posture information recorded together with the photographing image, combines the read information with the photographing image, and displays a combined image.

Figure 9:
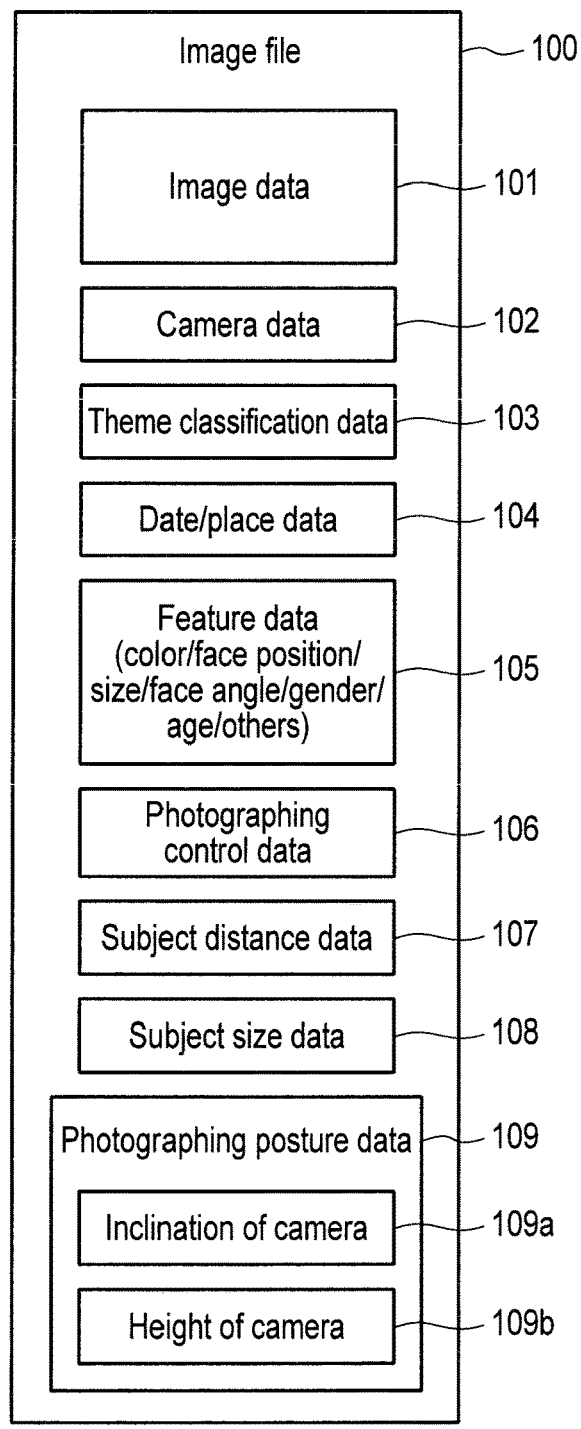
FIG. 9 is a view for explaining an example of a configuration of image file according to the first embodiment.

At step S114, the signal processing control unit 1 acquires information concerning a photographing posture of a user as described above. The signal processing control unit 1 combines image data obtained by the imaging operation, photographing posture data, and any other data to create such an image file 100 as shown in FIG. 9. That is, the image file 100 includes image data 101 that is data concerning an image obtained by the imaging unit 2, camera data 102 which is information concerning the digital camera 10, theme classification data 103 concerning theme classification obtained by the theme determination processing at step S104, date/place data 104 including information of a photographing date obtained by the clock 1g and information of a photographing place obtained by the position sensor 3, feature data 105 which includes feature data, colors, and a position, a size, an angle, a gender, and an age of a face as well as other aspects included in an image, photographing control data 106 of a shutter speed, an aperture, and other aspects, subject distance data 107 obtained based on a focal length, subject size data 108 representing a size of a subject occupying an image, and photographing posture data 109 including an inclination 109a of the camera and a height 109b of the camera. It is needless to say that the photographing posture data 109 may be iconic information like an avatar. Regardless of the format, it is preferable for camera manufacturers, mobile device manufacturers, and organizations that provide cloud services or photograph services to use these rules in common. It is to be noted that the image file including a photographing posture and other aspects can be created by the digital camera 10 as described above, but the digital camera 10 may also transmit necessary information to the server 50 so that the image file can be created in the server 50.

At step S115, the signal processing control unit 1 determines whether the image file is to be transmitted to the server 50. For example, it is assumed that transmission is effected when a transmission command is input from a user. If transmission is determined, the signal processing control unit 1 transmits the image file to the server 50 at step S116. If the transmission is determined to be not effected in the determination of step S115, the processing returns to step S101.

If the photographing mode was not determined at step S101, the processing advances to step S121. At step S121, the signal processing control unit 1 determines whether the current mode is a reproduction mode. If the reproduction mode was determined, the signal processing control unit 1 displays a list of images recorded in the recording unit 4 in the display unit 8 at step S122. At step S123, the signal processing control unit 1 determines whether enlarged reproduction was selected. If the enlarged reproduction was not selected, the processing returns to step S121. If the enlarged reproduction was determined to have been selected at step S123, the processing advance to step S124. At step S124, the signal processing control unit 1 enlarges and displays a selected image in the display unit 8. At step S125, the signal processing control unit 1 determines whether the selected image is to be transmitted to the server 50. If the selection was determined, the signal processing control unit 1 transmits an image file to the server 50 at step S126. Then, the processing advances to step S127. If the transmission was not determined at step S125, the processing advances to step S127. At step S127, whether the processing returns to the menu is determined at step S127. If the return was determined, the processing returns to step S121. If the return was not determined at step S127, the processing returns to step S124, and the enlarged display of each selected image is continued.

If the reproduction mode was not determined at step S121, the processing advances to step S131. At step S131, whether a notification such as information concerning a popular image is to be acquired from the server 50 is determined. If the acquisition of the notification was not determined, the processing advances to step S132. At step S132, the signal processing control unit 1 determines whether the processing is to be terminated. If the termination was determined, the processing is terminated. If the termination was not determined at step S132, the processing returns to step S101.

If the acquisition of the notification was determined at step S131, the processing advances to step S133. At step S133, the signal processing control unit 1 communicates with the server 50 and acquires the notification, e.g., the information concerning a popular image. The signal processing control unit 1 displays the acquired information including an image in the display unit 8. At step S134, the signal processing control unit 1 determines whether an evaluation value or the like provided by a user relative to the displayed notification is to be transmitted. If the transmission was determined, the signal processing control unit 1 transmits the evaluation value or the like provided by the user at step S135. Then, the processing advances to step S136. At step S134, if no transmission was determined, the processing advances to step S136. At step S136, the signal processing control unit 1 determines whether the processing returns to the menu. If the return was determined, the processing returns to step S101. If no return was determined at step S136, the processing returns to step S133, and the signal processing control unit 1 continues the display of the notification.

Figure 10:
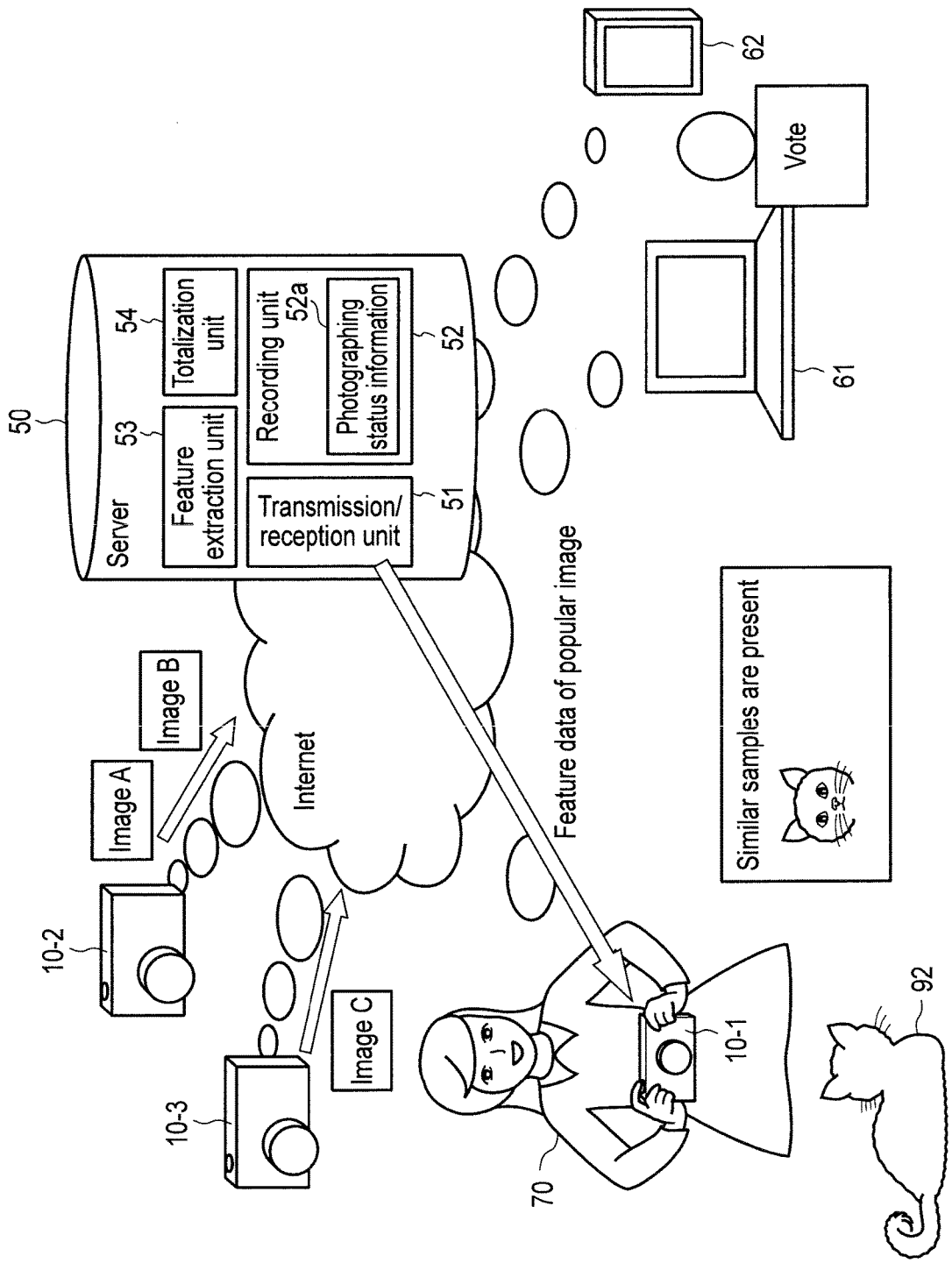
FIG. 10 is a view for explaining an example of a flow of data according to the first embodiment.

FIG. 10 shows a schematic view of a relationship among the server 50, the digital camera 10, and other aspects according to this embodiment. Many digital cameras 10 are connected to the server 50. In FIG. 10, a digital camera 10-1, a digital camera 10-2, and a digital camera 10-3 are connected. Further, a general PC 61, a smartphone 62, or other devices are also connected to the server 50.

A transmission/reception unit 51 configured to communicate with terminals, e.g., the digital camera 10, the PC 61, the smartphone 62, or other device is provided in the server 50. Furthermore, a recording unit 52 that records images received from the digital cameras 10 or other device is provided in the server 50. The recording unit 52 records an image file including such information as shown in FIG. 9. That is, the recording unit 52 includes photographing status information 52a including photographing posture data, subject distance data, date/place data, and other data. Furthermore, in the server 50 are provided a feature extraction unit 53 that extracts features of each image recorded in the recording unit 52 and a totalization unit 54 that totalizes data such as votes from respective users.

Each digital camera 10 transmits an image file of each acquired image to the server 50. For example, in the case shown in FIG. 10, the digital camera 10-2 transmits an image A and an image B to the server 50, and the digital camera 10-3 transmits an image C to the server 50. The server 50 receives the image files and records them in the recording unit 52. The image files are transmitted to the server 50 from not only the digital cameras 10 but also the PC 61, the smartphone 62, or other device. In addition, there are cases that the photographing posture data is not included in files other than image files created by the digital cameras 10.

The feature extraction unit 53 in the server 50 classifies the image files in accordance with information of themes determined by the digital cameras 10 and included in the image files. Moreover, the feature extraction unit 53 may extract features of images, determine themes based on results, and perform classification in accordance with the themes. The server 50 transmits the image files to the digital cameras 10, the PC 61, and other devices based on requests from the digital cameras 10, the PC 61, and other devices. The images received by the digital cameras 10, the PC 61, and other devices are viewed by users. For example, in FIG. 10, a user 70 takes a picture of a cat 92 that is the subject. When the digital camera 10-1 requests an image similar to an image that is currently acquired from the server 50, a sample image similar to the cat 92 is transmitted from the server 50 to the digital camera 10-1. Additionally, the server 50 transmits photographing posture data and the like when the transmitted image was acquired in response to a request from, e.g., each digital camera 10.

The user can evaluate the viewed image by voting or the like of a viewed image. That is, the user can transmit whether he/she likes a viewed image, give a point to the image, provide a comment, and such like via the server 50. The totalization unit 54 of the server 50 totalizes results of votes from the users and records a result in association with each image file recorded in the recording unit 52. For example, when the digital camera 10 requests for data of a popular image, the server 50 transmits an image that is recorded in the recording unit 52 and determined to be popular to this digital camera 10 or the like. Furthermore, the server 50 transmits, e.g., a result of totalizing popularity information to each digital camera 10, the PC 61, the smartphone 62, and other devices. This result may be a graph that shows a popularity of each image as shown in, e.g., FIG. 11. Moreover, popularity may be totalized in accordance with, e.g., each theme. For example, information showing that a picture of a baby is popular or that a picture of a baby and a mother is popular may be totalized.

Figure 5:
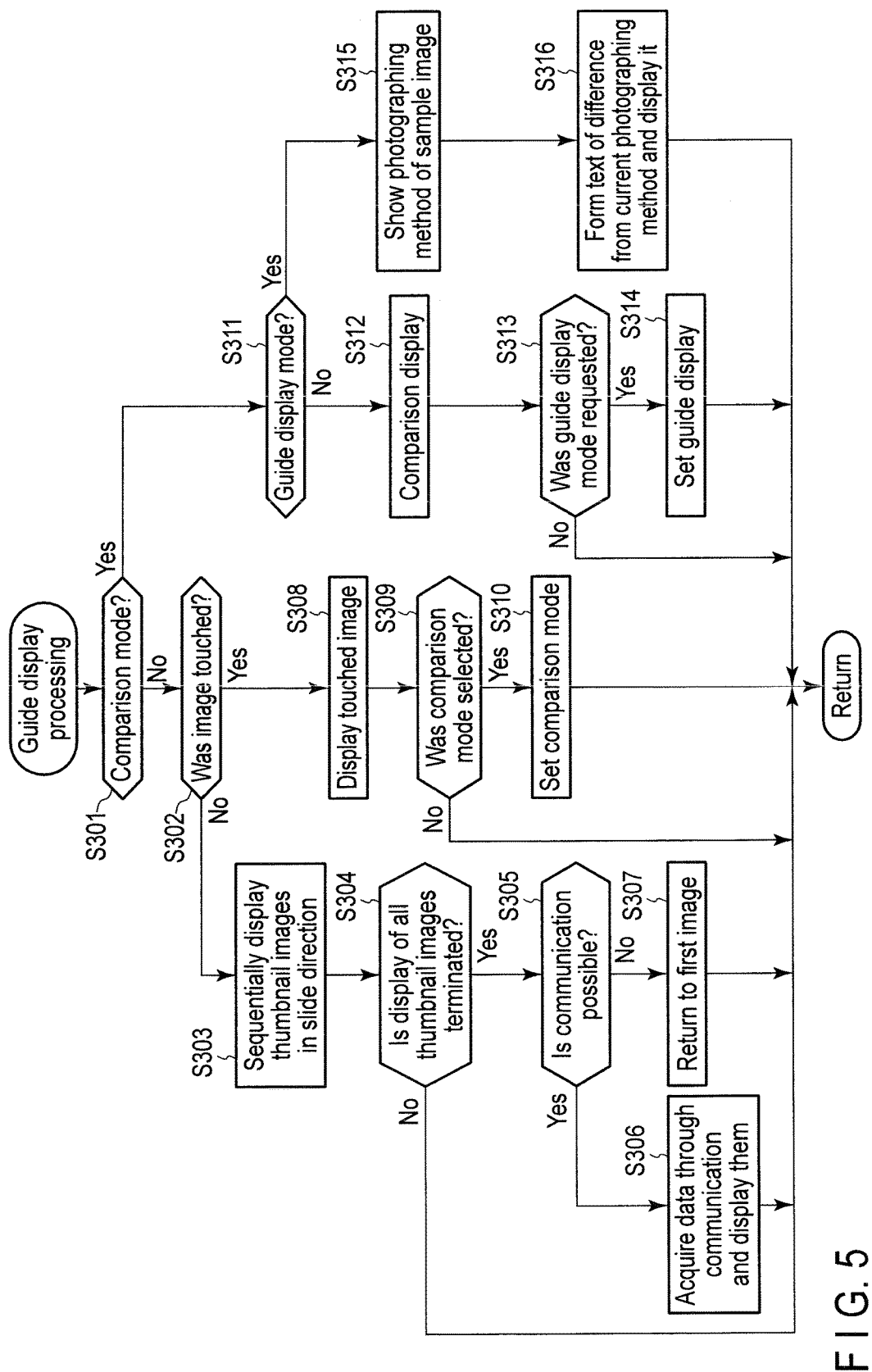
FIG. 5 is a flowchart showing an example of guide display processing in the digital camera according to the first embodiment.

The guide display processing of the digital camera 10 according to this embodiment explained with reference to FIG. 5 or processing of the server 50 in the transmission/reception of image data or the popularity voting explained with reference to FIG. 10 will now be described with reference to FIG. 12. At step S401, the server 50 determines whether a theme was successfully acquired from the digital camera 10. If the theme was successfully acquired, the server 50 transmits an image concerning the acquired theme to the digital camera 10 at step S402. At step S403, the server 50 determines whether a request for an image from the digital camera 10 was terminated. If the request for an image was not terminated, the processing returns to step S402, and transmission of a related image to the digital camera 10 is continued. If the request for an image was determined to have been terminated at step S403, the processing advances to step S404. At step S404, the server 50 terminates the transmission of a related image, and the processing returns to step S401.

If the theme was determined to have not been acquired at step S401, the processing advances to step S411. At step S411, the server 50 determines whether the digital camera 10 is performing the comparative display. If the comparative display was determined, the server 50 transmits position data of each position in the image transmitted to the digital camera 10 at step S412. For example, when an image including a face is transmitted as sample data, information concerning a profile of this face or information of positions of eyes, a nose, a mouth, and other parts is transmitted to the digital camera 10. Then, the processing returns to step S401.

If the comparative display was determined to have not been performed at step S411, the processing advances to step S421. At step S421, the server 50 determines whether the digital camera 10 is performing the guide display. If the guide display was determined to be being performed, information concerning a photographing method including photographing posture data is transmitted to the digital camera 10 at step S422.

If the guide display was determined to be not being performed at step S421, the processing advances to step S431. At step S431, the server 50 determines whether an image display is requested. If the image display was determined to be requested, the server 50 transmits data of the requested image to, e.g., the digital camera 10, the PC 61, or the smartphone 62 at step S432. At step S433, the server 50 determines whether voting concerning popularity voting or the like was carried out in regard to the transmitted image data. If the voting was determined to have been performed, the server 50 records a voting result in the recording unit 52 in accordance with each image at step S434. Then, the processing returns to step S401.

If the image display was determined to have not been requested at step S431, the processing advances to step S441. At step S441, the server 50 receives an image and determines whether recording this image was requested. If the recording was not requested, the processing returns to step S401. If the recording was requested at step S441, the processing advances to step S442. At step S442, the server 50 records the received image in the recording unit 52. At step S443, the server 50 determines whether the image file includes the image together with photographing posture data. If the photographing posture data is not included, the processing returns to step S401. If the photographing posture data was determined to be included at step S443, the processing advances to step S444. At step S444, the server 50 records the photographing posture data in the recording unit 52. The server 50 may create an image representing a photographing posture based on the photographing posture data. This image may be recorded in the recording unit 52. Subsequently, the processing returns to step S401.

As described above, for example, the imaging unit 2 functions as an imaging unit that acquires a subject image which is an image of a subject. For example, the sample acquisition unit 1b functions as a sample acquisition unit that acquires a sample image. For example, the guide display generation unit 1f functions as a guide display generation unit that creates a guide display showing a photographing method to approximate the composition of the subject image to the composition of the sample image. For example, the display unit 8 functions as a display unit that displays the guide display. For example, an image file 100 functions as a sample file including the sample image and position and posture information representing a position and a posture of the sample imaging unit that acquired the sample image. For example, the photographing state determination unit 1h functions as a feature extraction unit that extracts a subject feature portion as a feature portion of the subject image and a sample feature portion as a feature portion of the sample image. For example, the theme determination unit 1d functions as a theme determination unit that determines a theme of the subject image in accordance with the subject image.

For example, the photographing state determination unit 1h functions as a position and posture information calculation unit that calculates position and posture information representing a position and a posture of the imaging unit based on a gravity direction and height information. For example, the signal processing unit 1a functions as an image file creation unit that creates an image file in which the subject image is associated with the position and posture information. For example, the distance determination unit 1i functions as a distance acquisition unit that acquires a subject distance as a distance to the subject.

According to this embodiment, the digital camera 10 can notify a user of, e.g., information showing a photographing posture for a sample image obtained from the server 50 or the like. The digital camera 10 can notify a user of, e.g., a difference between a sample image and an image that is to be acquired by the user through the guide display or the like. According to such a guide display, the user can easily acquire an image having the same composition as the sample image.

Further, according to this embodiment, the digital camera can acquire information concerning a posture taken by the user to perform photographing by using outputs from various kinds of sensors. Therefore, a posture at the time of this photographing can be easily recorded on the acquired image. Furthermore, the digital camera 10 can notify the user of a difference between a posture in which the user is about to perform photographing and a posture in which the user took the image obtained from the server 50.

According to this embodiment, the digital camera 10 can acquire from the server 50 each image concerning a theme relating to an image that is to be acquired by the user and display the acquired image. At this time, the digital camera 10 can also display images concerning the theme in a popularity order. When a theme of a through image is determined and images matching the theme are displayed in the display unit 8 as described above, the user can confirm each image of interest without performing a special operation such as inputting a keyword.

Moreover, for example, since each sample image is acquired from the server 50 through the Internet, the digital camera 10 can acquire a very large number of images. As shown in FIG. 2B, in the digital camera 10, since images that can be candidates for the sample image are sequentially displayed and the user can select one from these images, the user can rapidly and intuitively select his/her favorite image.

When posture difficulty level information is added to a sample image as described above, the user can determine that a displayed posture or body position or a tool to be used cannot be adopted, and effort does not have to be wasted. For example, there are cases that the user determines that photographing while lying on one's belly is impossible depending on the clothes worn. Additionally, there are cases that the user determines that photographing using a tool is difficult since he/she does not have the tool or determines that a difficulty level is high in photographing while stretching out since the user's height is insufficient. Converting a difficulty level into a numerical value and recording it in association with each posture as described above enables exercising an effect in the determination mentioned above.

Further, the digital camera 10 can record an acquired image in the server 50 through, e.g., the Internet. As a result, the acquired image can be shared by many people, and evaluations or the like of persons other than a photographer can be easily obtained. Since information such as popularity of an image based on evaluations of other people can be added to the image, the digital camera 10 can select a more appropriate sample image. For example, functions included in the server 50 shown in FIG. 10 or part of a program that executes the processing shown in FIG. 12 may be included in the digital camera. Furthermore, functions in the server may be dispersed and provided in servers or the user's PC or a mobile device.

Second Embodiment

The step S315 and step S316 of the guide display processing in the first embodiment are different from counterparts in a second embodiment. In the first embodiment, the digital camera 10 performs the guide display based on photographing posture data obtained when a sample image included in an image file was acquired. On the other hand, in this embodiment, the digital camera 10 estimates a photographing method based on an image and performs the guide display.

Figure 13:
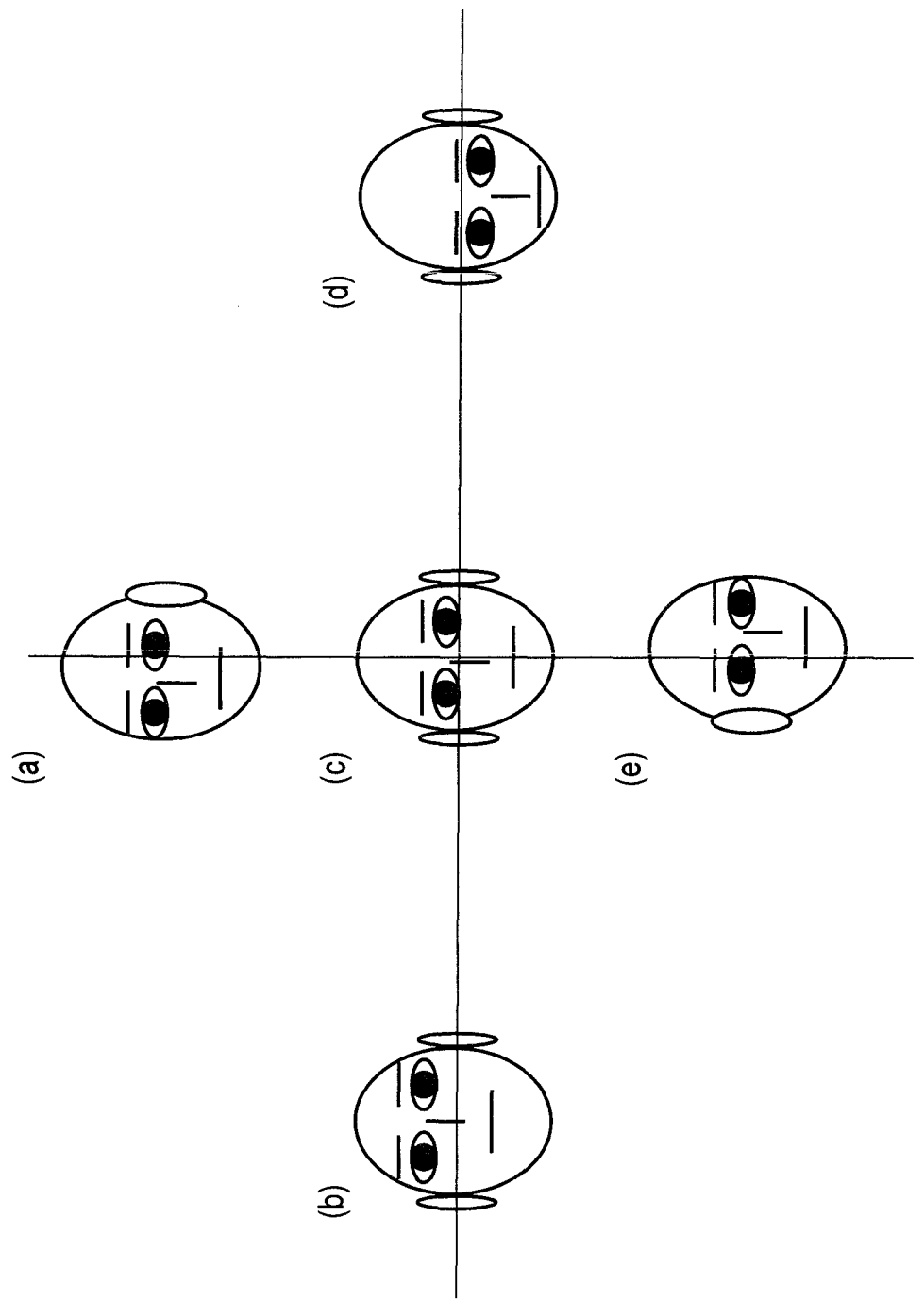
FIG. 13 is a view for explaining estimation of a photographing method based on images according to a second embodiment.

Estimating a photographing method based on an image will now be described with reference to FIG. 13. For example, when attention is paid to a person's face, a determination can be made based on which side the center of eyes, a ridge of a nose, or a mouth tilts toward with respect to the center of the face. For example, when the digital camera 10 directly faces the face from the front side, a positional relationship of respective portions of the face is as shown in FIG. 13(c). Based on this relationship, for example, when the digital camera 10 is arranged to face the face from the right side of the face, the respective portions of the face tilt toward the left side as shown in FIG. 13(a). For example, when the digital camera 10 is arranged to face the face from the left side of the face, the respective portions of the face tilt toward the right side as shown in FIG. 13(e). For example, when the digital camera 10 is arranged to face the face from the lower side of the face, the respective portions of the face tilt toward the upper side as shown in FIG. 13(b). For example, when the digital camera 10 is arranged to face the face from the upper side of the face, the respective portions of the face tilt toward the lower side as shown in FIG. 13(d).

Figure 14A:
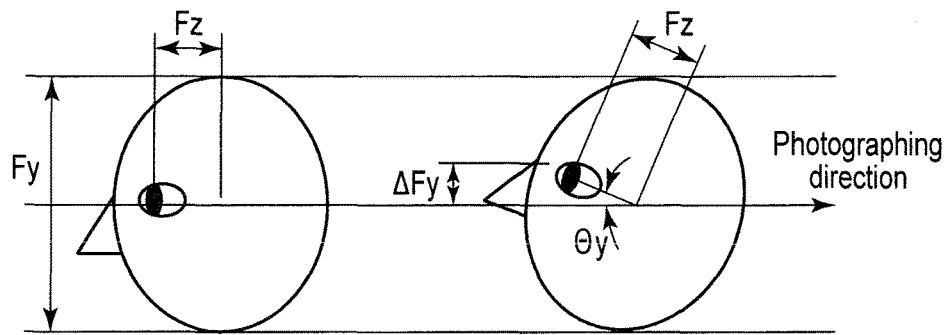
FIG. 14A is a view for explaining the estimation of the photographing method based on images according to the second embodiment.
Figure 14B:
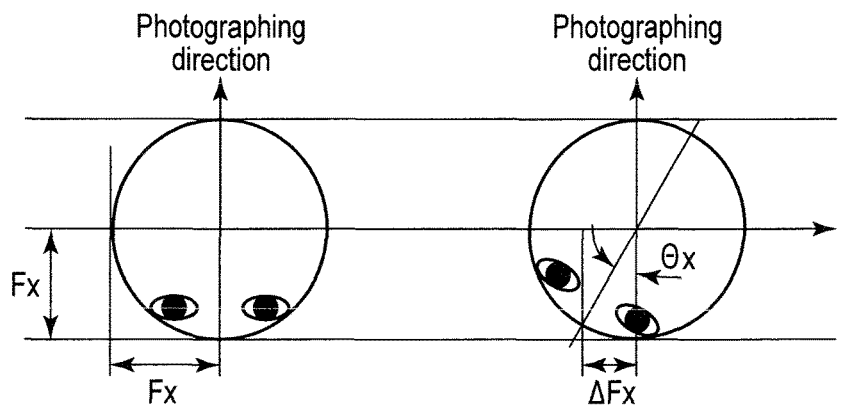
FIG. 14B is a view for explaining the estimation of the photographing method based on images according to the second embodiment.

A method for calculating an angle of the digital camera 10 relative to a face from a positional relationship of respective portions of the face in an image will now be described with reference to FIG. 14A and FIG. 14B. First, a method for obtaining an angle of the face in the vertical direction of the face, i.e., an inclination angle $\Theta y$ will be described. FIG. 14A is a schematic view showing the face from a lateral side. It is assumed that a distance from the center of the face to a pupil seen from the lateral side is Fz. Further, a height of the face seen from the lateral side is assumed to be Fy. The following Expression (1) can be presumed based on a ratio of a general human body.

$$Fy = 3 \times Fz \quad (1)$$

Assuming that a height from the center of the face to the pupil is $\Delta Fy$, the following Expression (2) can be achieved.

$$\Delta Fy/Fz = \sin \Theta y \quad (2)$$

Based on Expressions (1) and (2), the following Expression (3) can be achieved.

$$3 \times \Delta Fy/Fy = \sin \Theta y \quad (3)$$

Therefore, based on the image obtained from the front side direction, the inclination angle of the face can be calculated from the height Fy of the face and the height $\Delta Fy$ from the center of the face to the center of the pupil by using Expression (3).

A description will now be given as to a method for obtaining an angle of the face in the horizontal direction, i.e., a rotation angle Θx based on an image. FIG. 14B shows a schematic view when the face is seen from the upper side.

It is assumed that the face has a circular shape with a radius of Ex as seen from the upper side. At this time, a distance from a central line of the face, e.g., a nose to a pupil is assumed to be ΔFx. At this time, the following Expression (4) can be achieved.

$$\Delta Fx/Fx = \sin \Theta x \quad (4)$$

Therefore, the rotation angle of the face can be calculated from the radius Fx of the face and the distance ΔFx from the center of the face to the center of the pupil based on the image obtained from the front side direction by using Expression (4). It is to be noted that the example targeting the face has been described, but the present invention is not restricted thereto. A human body or the like may be determined as a target, or a flower or a building may be determined as a target. Based on features of a subject, a direction of the subject can be estimated.

Figure 15:
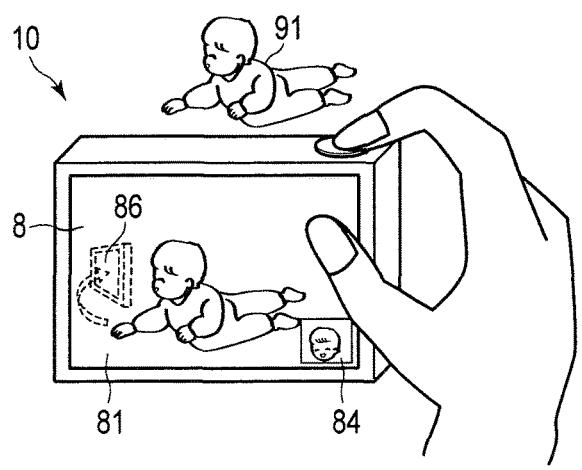
FIG. 15 is a view for explaining an example of a guide display according to the second embodiment.

Since a rotation angle and an inclination angle of, e.g., a face can be obtained based on an image, these angles in a through image that is to be acquired by a user can be compared with counterparts in a sample image selected by the user. The guide display generation unit if can create a guide display that shows a photographing direction that enables acquiring the same image as a sample image based on these angles. For example, as shown in FIG. 15, an indication display 86 that shows a direction in which the digital camera 10 should be moved relative to a subject 91 may be superimposed on a current through image 81 while displaying the through image 81. For this indication display (the guide display), information in a database searched for the purpose of the comparison is exploited. Furthermore, the indication display may be provided by using a language or a figure in accordance with codes stored in the database. At this time, a selected sample image 84 may be also displayed in the display unit 8. Moreover, for example, based on a size of a face in an image, a guide display for, e.g., increasing or shortening a distance from the digital camera 10 to the subject 91 or increasing or reducing a focusing distance of the lens 2a may be carried out.

The guide display is determined from a difference between an actual photographing status (a posture) and a photographing status (a posture) of a sample image. Therefore, information indicative of the difference between postures is recorded in the recording unit 4 of the camera or the recording unit 52 of the server, and the digital camera 10 reads out this information and performs the guide display. The guide display may display text information like "please stand up" or "please sit down". The text information may be information showing a posture itself like "stretch up and take a picture". When a user sees information of a posture, he/she can understand photographing is impossible unless he/she stretches up, and hence such information also functions as a guide. As the guide display, for example, in a situation that a user is sitting or standing, if a sample image has posture information that this image was acquired by the user while lying on his/her belly, a text such as "please lie down and sight at a lower angle" or "you cannot take a picture unless you are lying in place of standing" may be displayed. That is, a great effect can be exercised when not only the posture information is used as it is but also it is used as a difference between the posture information included in a sample image and a current posture. It is also possible to issue a turn-around instruction by detecting not only a posture but also a direction of a face, a direction of any other subject, or other direction. Moreover, when the subject is a building or the like, positional information based on azimuth information or GPS information may be also used. As the guide display, a size of a subject, a difference in photographing parameter setting at the time of photographing, or other factor may be reflected. For example, a text "please take a picture from 200 m on the west side toward the northwest with a focal length of 100 mm and an inclination angle of 20°" may be displayed. A language that differs depending on each country or region may be used for text information.

Further, the guide display may be graphic representation using an image, a symbol such as an arrow, or moving picture representation. Furthermore, a warning display or the like may be carried out as the guide display. Moreover, sounds may be used. In the case of creating a guide display showing a moving direction, recorded contents recorded in the database or the like may be displayed as they are, or the recorded contents may be graphically represented or translated and displayed.

Figure 6D:
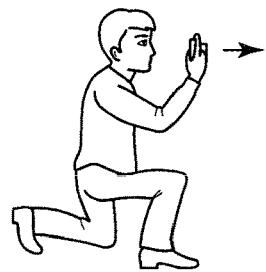
FIG. 6D is a view showing an example of the guide display in the digital camera according to the first embodiment.
Figure 6E:
FIG. 6E is a view showing an example of the guide display in the digital camera according to the first embodiment.
Figure 6F:
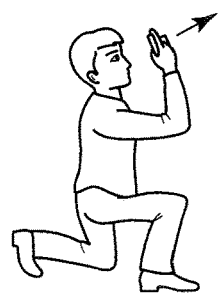
FIG. 6F is a view showing an example of the guide display in the digital camera according to the first embodiment.

Additionally, for example, it is assumed that the signal processing control unit 1 determines that a user holds the digital camera 10 as shown in FIG. 6B based on outputs from the acceleration sensor 9a and the atmospheric pressure sensor 9c. Further, at this time, it is also assumed that the signal processing control unit 1 determines that a face in a sample image is provided on a front side like FIG. 13(c), but a through image is as shown in FIG. 13(d), i.e., the digital camera 10 takes a picture from a higher position than the sample image. In such a case, the signal processing control unit 1 may display, e.g., such an image as shown in FIG. 6D in the display unit 8 as a guide display.

According to this embodiment, the guide display can be carried out even though a sample image does not include photographing posture information. The photographing posture information can be added to an image acquired by the digital camera 10.

Modification of Second Embodiment

A modification of the second embodiment will now be described here. Here, a difference between the first embodiment and the second embodiment will be explained, and like parts will be denoted by like reference signs to omit a description thereof. In the first embodiment, the guide display is created based on photographing posture data or the like included in an image file of a sample image. Therefore, in the first embodiment, a through image is not used for the guide display. On the other hand, in the second embodiment, the guide display is created based on a comparison between a sample image and a through image. In this embodiment, a guide display is created based on photographing posture data or the like included in an image file of a sample image and a comparison between the sample image and a through image.

For example, consideration will be given on a situation where such photographing posture data as shown in FIG. 6A is recorded in an image file of a sample image and a face in the sample image is provided on a front side as shown in FIG. 13(c). At this time, when a through image is as shown in FIG. 13(d), i.e., when the digital camera 10 takes a picture from a higher position than the sample image, the digital camera 10 displays such a guide image like FIG. 6D rather than FIG. 6A, for example. According to this modification, the guide display that is further more appropriate than the first embodiment or the second embodiment can be carried out.

It is to be noted that the foregoing embodiments according to the present invention include the following inventions.

(1) An imaging apparatus comprising:
an imaging unit which acquires a subject image as an image of a subject;
an acceleration sensor which detects a gravity direction;
an atmospheric pressure sensor which acquires height information; and
a position and posture information calculation unit which calculates position and posture information indicative of a position and a posture of the imaging unit based on the direction of gravity and the height information.

(2) The imaging apparatus according to (1), further comprising an image file creation unit which creates an image file in which the subject image is associated with the position and posture information.

(3) The imaging apparatus according to (1) or (2), wherein the position and the posture information calculation unit calculates a holding height which is a height of the imaging apparatus relative to a photographer holding the imaging apparatus based on change in an atmospheric pressure value output from the atmospheric pressure sensor in elapsed time.

(4) The imaging apparatus according to (3), wherein the position and posture information calculation unit calculates the holding height based on the atmospheric pressure value when the atmospheric pressure value periodically fluctuates.

(5) The imaging apparatus according to (2), further comprising a distance acquisition unit which acquires a subject distance as a distance to the subject, wherein the image file creation unit creates the image file in which the subject image and the subject distance is associated as well.

(6) A display apparatus which displays an acquired image including posture information obtained at a time of photographing, the apparatus comprising a display control unit which displays the acquired image and auxiliary information including characters or an image representing the posture information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging unit which acquires a subject image as an image of a subject;
a height sensor which acquires height information on the imaging apparatus; and
a processor configured to:
determine a reference height by acquiring the height information when a photographer is walking with the imaging apparatus;
determine an imaging height, which is height information based on which the imaging operation is performed using the reference height;
generate posture data, using the imaging height; and
generate an image file including the posture data, wherein the posture data is configured to be used for searching an image file including posture data similar to the posture data generated.

2. The imaging apparatus according to claim 1, wherein the processor is configured to generate the image file which includes, as the posture data, information indicating that the photographer is squatting down.

3. The imaging apparatus according to claim 1, wherein the processor is configured to generate the image file which includes, as the posture data, information indicating that the photographer is holding the imaging apparatus at a high level.

4. The imaging apparatus according to claim 1, wherein the processor is configured to generate the image file which includes, as the posture data, information indicating that the photographer is standing.

5. The imaging apparatus according to claim 1, wherein the processor is configured to generate the image file which includes, as the posture data, information indicating that the photographer is lying on his/her belly.

6. The imaging apparatus according to claim 1, further comprising:
an inclination sensor,
wherein the processor is further configured to:
acquire, from the inclination sensor, information indicating how the imaging apparatus is inclined with reference to a horizontal direction; and
generate the image file which includes, as the posture data, information indicating how the imaging apparatus is inclined.

7. An imaging apparatus comprising:
an imaging unit which acquires a subject image as an image of a subject;
a height sensor which acquires height information on the imaging apparatus; and
a processor configured to:
determine a reference height by acquiring the height information when a photographer is walking with the imaging apparatus;
determine an imaging height, which is height information based on which the imaging operation is performed using the reference height;
generate posture data, using the imaging height;
generate an image file including the posture data; and
a display,
wherein the processor is further configured to:
search an image file for an image including posture data similar to the posture data generated; and
display the image, which is a search result, on the display.

8. A display apparatus comprising:
a display; and
a processor configured to:
determine a reference height by acquiring height information when a photographer is walking with an imaging apparatus;
determine an imaging height, which is height information based on which the imaging operation is performed using the reference height;
generate posture data, using the imaging height;
search an image file for an image having posture data similar to the posture data generated; and
display the image, which is a search result, on the display.

9. The display apparatus according to claim 8, wherein the processor is configured to display, on the display with the image, an icon which indicates a photographing posture based on the posture data.

10. The display apparatus according to claim 8, wherein the processor is configured to display, on the display with the image, information indicative of a difference between a photographing posture based on the posture data generated and a photographing posture based on the posture data of the image which is the search result.

11. An image file generation method comprising:
acquiring a subject image as an image of a subject;

acquiring height information on an imaging apparatus;
determining a reference height by acquiring the height information when a photographer is walking with the imaging apparatus;
determining an imaging height, which is height information based on which the imaging operation is performed using the reference height;
generating posture data, using the imaging height; and
generating an image file including the posture data, wherein the posture data is configured to be used for searching an image file including posture data similar to the posture data generated.

12. A displaying method comprising:
determining a reference height by acquiring height information when a photographer is walking with an imaging apparatus;
determining an imaging height, which is height information based on which the imaging operation is performed using the reference height;
generating posture data, using the imaging height;
searching an image file for an image having posture data similar to the posture data generated; and
displaying the image, which is a search result, on the display.

13. An imaging apparatus comprising:
an imaging unit which acquires a subject image as an image of a subject;
a height sensor which acquires height information on the imaging apparatus; and
a processor configured to:
  determine a reference height by acquiring the height information when a photographer is walking with the imaging apparatus;
  determine an imaging height, which is height information based on which the imaging operation is performed using the reference height;
  generate posture data, using the imaging height; and
  generate an image file including the posture data and difficulty level information related to the posture data.

14. An image file generation method comprising:
acquiring a subject image as an image of a subject;
acquiring height information on an imaging apparatus;
determining a reference height by acquiring the height information when a photographer is walking with the imaging apparatus;
determining an imaging height, which is height information based on which the imaging operation is performed using the reference height;
generating posture data, using the imaging height; and
generating an image file including the posture data and difficulty level information related to the posture data.

* * * * *